United States Patent
Brown et al.

(10) Patent No.: US 11,647,089 B2
(45) Date of Patent: *May 9, 2023

(54) GENERATING A DYNAMIC DEPENDENT CLIENT DEVICE ACTIVITY DASHBOARD AND MANAGING CONTACT-CONTROL PRIVILEGES VIA MANAGING CLIENT DEVICE INTERFACES

(71) Applicant: Meta Platforms, Inc., Menlo Park, CA (US)

(72) Inventors: Philip Morgan Brown, Laguna Hills, CA (US); Reem Helou, East Palo Alto, CA (US); Adam Vicent Cristobal, San Francisco, CA (US); Hadi Abou El Kheir, Santa Clara, CA (US); Ashu Khaitan, San Francisco, CA (US); Jeremy Taylor Barton, San Francisco, CA (US); Katarina Ling, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,525

(22) Filed: Oct. 5, 2021

(65) Prior Publication Data

US 2022/0141306 A1    May 5, 2022

Related U.S. Application Data

(63) Continuation of application No. 16/928,876, filed on Jul. 14, 2020, now Pat. No. 11,140,240.

(51) Int. Cl.
*H04L 12/00* (2006.01)
*H04L 67/306* (2022.01)
(Continued)

(52) U.S. Cl.
CPC .......... *H04L 67/306* (2013.01); *G06F 3/0482* (2013.01); *G06F 9/451* (2018.02); *G06F 9/547* (2013.01); *H04L 51/52* (2022.05)

(58) Field of Classification Search
CPC ....... H04L 67/306; G06F 9/54; G06F 3/0482; G06F 9/451
(Continued)

(56) References Cited

U.S. PATENT DOCUMENTS 8,699,998 B2 * 4/2014 Sprigg .................. H04L 51/212
455/410
9,519,783 B2 12/2016 Pruthi et al.
(Continued)

OTHER PUBLICATIONS

"An App Made Just for Kids," YouTube Kids, Jul. 28, 2020, 6 pages, Retrieved from the Internet: URL: https://youtube.com/kids/?gclid=CjwKCAjwmf_4BRABEiwAGhDfSastKs5XpeK1cX_BYFj-xlYN0cVLCKygJkmuZ3134jW8JvpP9A3q0BoCbblQAvD_BwE&gclsrc=aw.ds.
(Continued)

*Primary Examiner* — Frantz Coby
(74) *Attorney, Agent, or Firm* — Keller Preece PLLC

(57) ABSTRACT

The present disclosure relates to systems, non-transitory computer-readable media, and methods for dynamically providing a activity dashboard for display within a graphical user interface. In particular, the disclosed systems can intelligently display, within the activity dashboard, insights of digital activity within an application of a child account. For example, the disclosed systems can monitor digital activity associated with recent contacts and groups, contact updates, and digital media items exchanged in messaging chat threads. In turn, the disclosed system can selectively surface one or more portions (and/or indications) of the monitored digital activity in the activity dashboard along with corresponding actionable options available for user selection. In
(Continued)

response to user interaction with the actionable options corresponding to the selectively surfaced digital activity, the disclosed systems can intuitively modify the child account to regulate viewable content and digital communications with third-party child accounts.

20 Claims, 18 Drawing Sheets

(51) Int. Cl.
*G06F 3/0482* (2013.01)
*G06F 9/54* (2006.01)
*G06F 9/451* (2018.01)
*H04L 51/52* (2022.01)

(58) Field of Classification Search
USPC .................................................. 709/203–204
See application file for complete search history.

(56) References Cited

U.S. PATENT DOCUMENTS

| | | | |
|---|---|---|---|
| 10,217,141 B2 | 2/2019 | Hoffman | |
| 10,462,024 B1 | 10/2019 | Kavanagh et al. | |
| 11,140,240 B1* | 10/2021 | Brown | H04L 67/535 |
| 2009/0144183 A1* | 6/2009 | Gatchell | G06Q 30/04 |
| | | | 705/34 |
| 2010/0131392 A1* | 5/2010 | Archer | G06Q 40/12 |
| | | | 705/26.1 |
| 2012/0304095 A1 | 11/2012 | Dennis | |
| 2013/0040604 A1* | 2/2013 | Sprigg | H04L 51/212 |
| | | | 455/410 |
| 2014/0150068 A1* | 5/2014 | Janzer | H04L 63/10 |
| | | | 726/4 |
| 2014/0214640 A1* | 7/2014 | Mallikarjunan | G06Q 20/322 |
| | | | 705/35 |
| 2015/0326550 A1* | 11/2015 | Schropfer | H04L 63/08 |
| | | | 726/7 |
| 2018/0082232 A1 | 3/2018 | Howard et al. | |
| 2018/0174060 A1 | 6/2018 | Velez-Rojas et al. | |
| 2019/0325778 A1* | 10/2019 | Singh | G09B 19/00 |
| 2019/0355063 A1 | 11/2019 | Probetts et al. | |
| 2021/0073713 A1 | 3/2021 | Balasubramanian et al. | |

OTHER PUBLICATIONS

Constine J., "Facebook 'Messenger Kids' Lets Under-13s Chat With Whom Parents Approve," TechCrunch.com, Dec. 4, 2017, 14 pages, Retrieved from the Internet: URL: https://techcrunch.com/2017/12/04/facebook-messenger-kids/.

"Just Talk Kids: Safe Video Chat & Messaging," Jul. 28, 2020, 5 pages, Retrieved from the Internet: URL: https://kids.justalk.com.

Perez S., "The iPhone's New Parental Controls can limit Who kids can Call, Text and FaceTime and When," TechCrunch.com, Dec. 10, 2019, 10 pages, Retrieved from the Internet: URL: https://techcrunch.com/2019/12/10/apples-new-parental-controls-can-limit-who-kids-can-call-text-and-facetime-and-when/.

"Turn Screen Time into Family Time," Kinzoo, Jul. 28, 2020, 7 pages, Retrieved from the Internet: URL: https://kinzoo.com.

\* cited by examiner

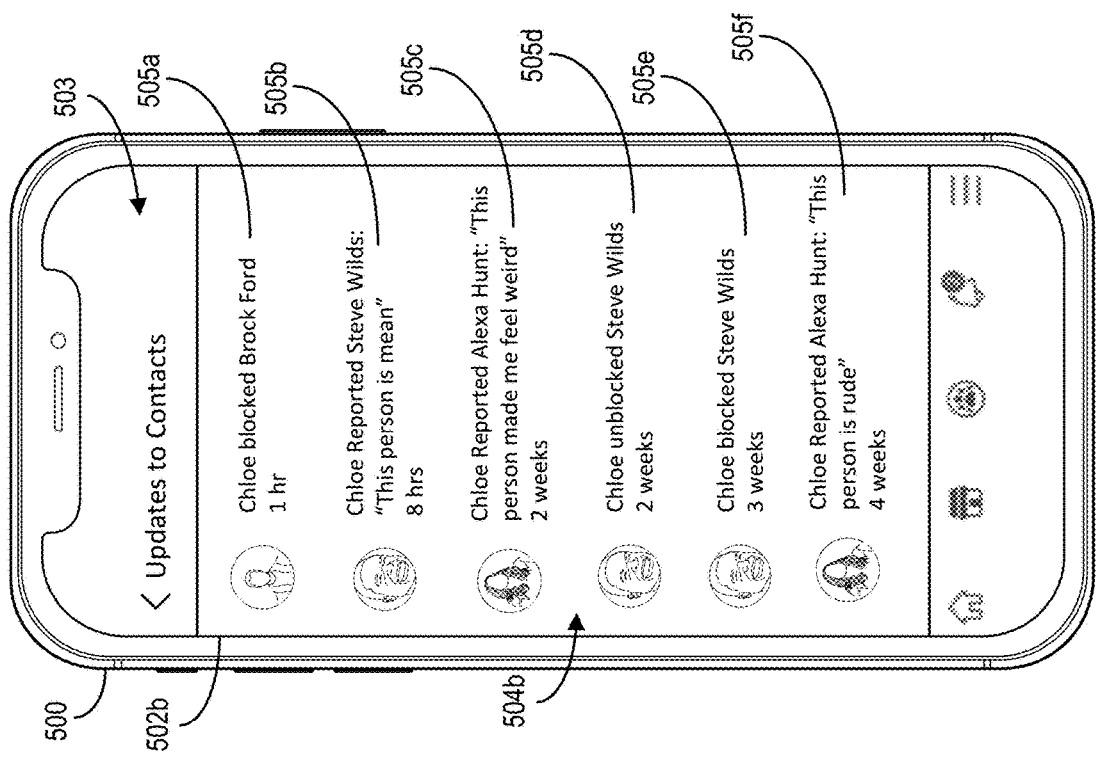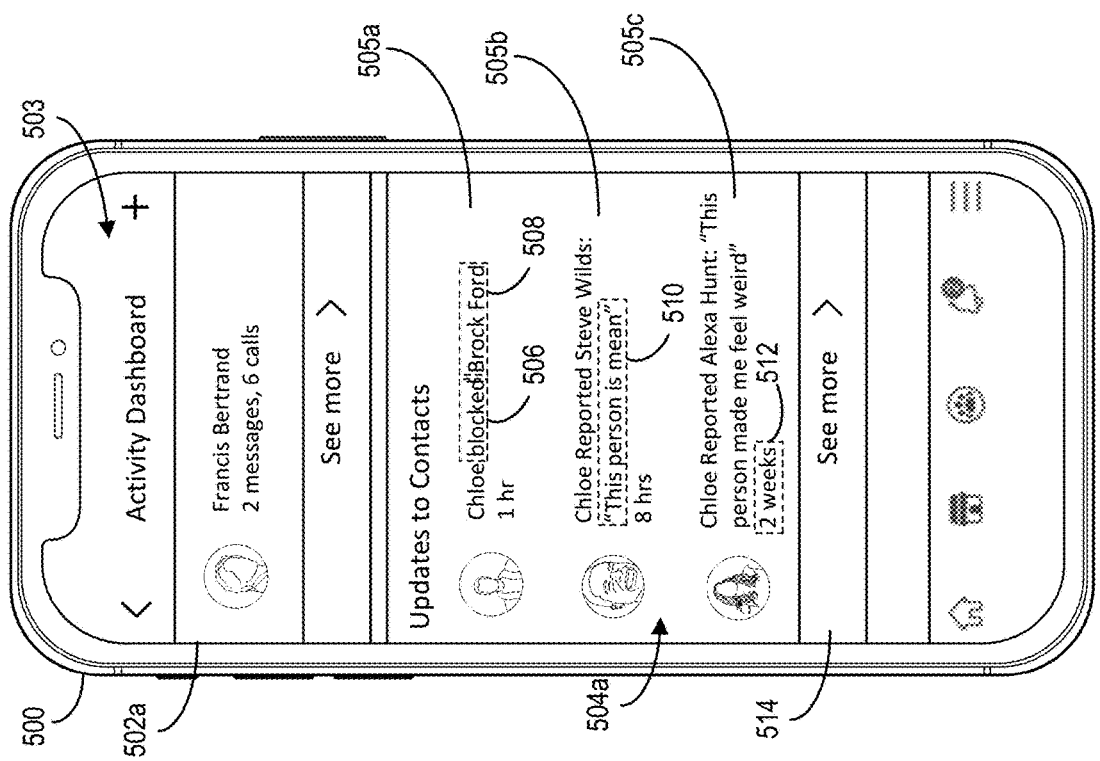

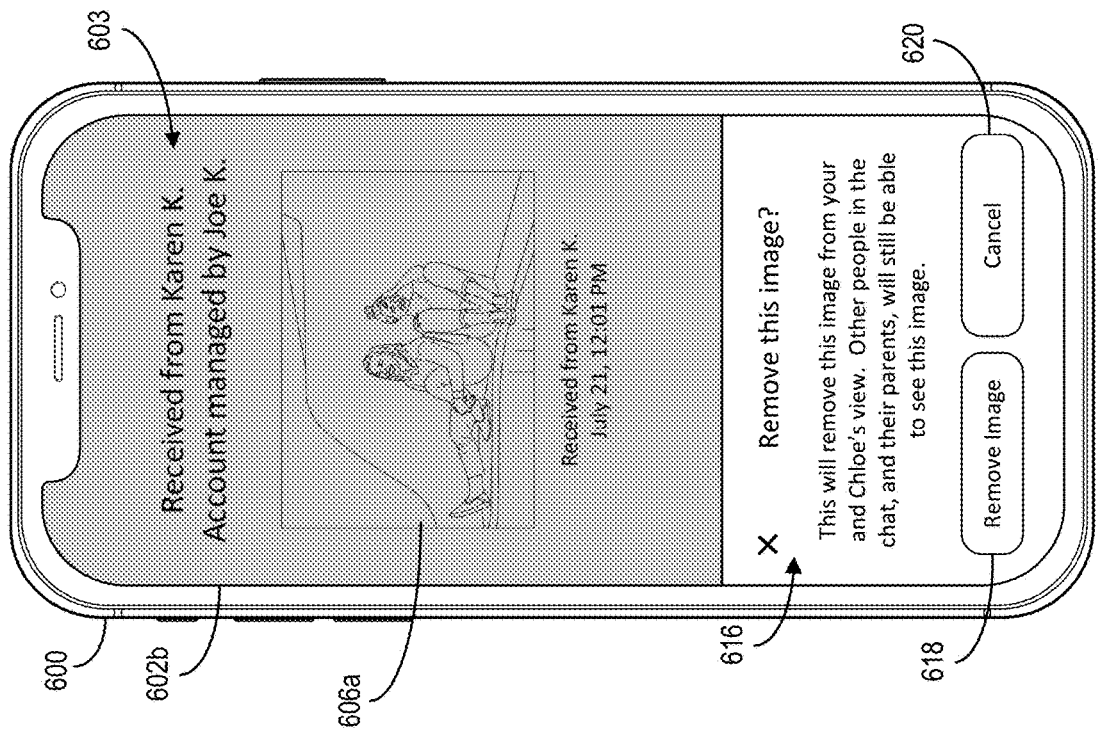
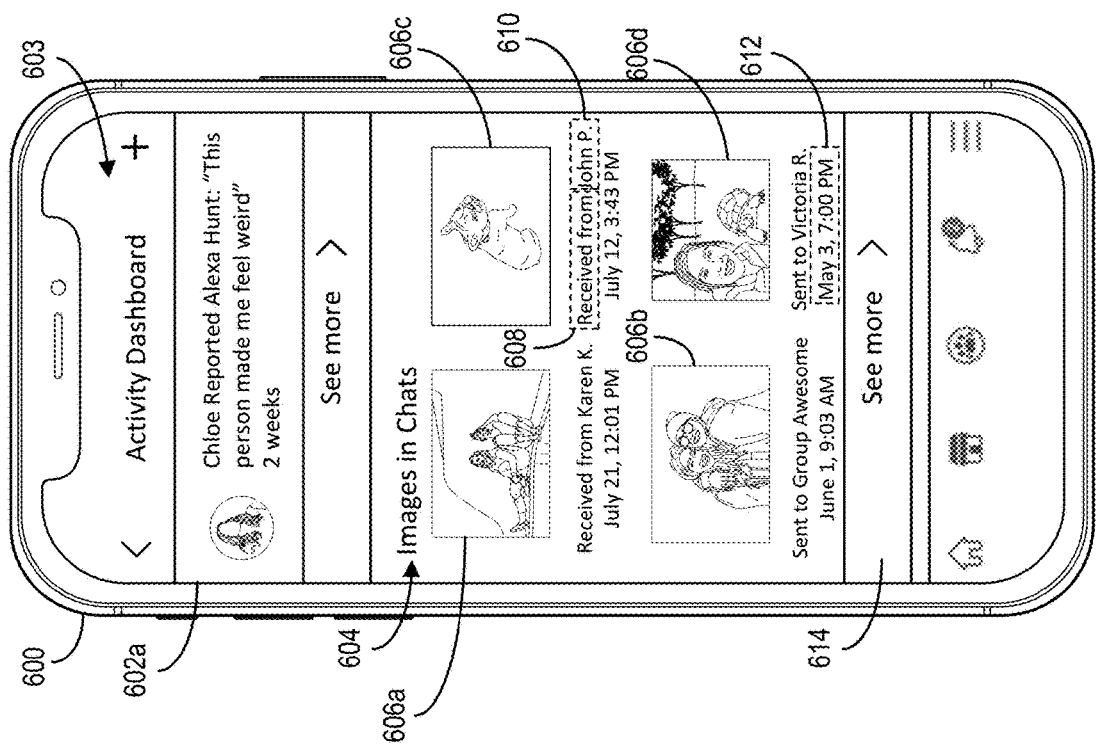
Fig. 6B
Fig. 6A

GENERATING A DYNAMIC DEPENDENT CLIENT DEVICE ACTIVITY DASHBOARD AND MANAGING CONTACT-CONTROL PRIVILEGES VIA MANAGING CLIENT DEVICE INTERFACES

CROSS-REFERENCE TO RELATED APPLICATIONS

The present application is a continuation of U.S. application Ser. No. 16/928,876, filed on Jul. 14, 2020. The aforementioned application is hereby incorporated by reference in its entirety.

BACKGROUND

Recent years have seen significant improvements in computer systems that provide digital communications across client devices utilizing computer networks. Indeed, due to software and hardware advancements, communication systems can capture and disseminate a variety of digital communications (such as instant messages or video chats) via a variety of applications on client devices via remote servers. Unfortunately, a number of technical problems have stifled implementation of such communication systems on client devices for children, minors, or other dependent users. For example, although some conventional systems implement some digital safety features for dependent users, conventional systems suffer from a variety of technical problems that lead to limited controls and functionality, decreased digital security, and operational inefficiency.

For example, conventional systems generally offer limited digital control features, such as contact controls or time usage limits. These digital oversight features, while helpful, are often insufficient to safeguard client devices of dependent users. Additionally, conventional systems often require logging into an account of a dependent (or directly accessing a client device of the dependent) to monitor or control activity by a client device of the dependent user. For example, conventional user interfaces of parent devices logged into parent accounts do not provide the technical capability to perform safeguarding actions beyond the limited set of controls just mentioned above. Thus, to perform most other monitoring or corrective actions, conventional communication systems require logging into the child account or directly accessing the child device.

In addition to limited controls and functionality, conventional systems also undermine security of client devices operated by vulnerable dependents. Indeed, the sophistication of operating users is often the most significant factor in operational security of any particular client device. Unsophisticated users, such as children or other dependents, are often most susceptible to phishing schemes, digital piracy, or online criminals/pedophiles. Such users are also often the most influenced by inappropriate digital content. Conventional systems, however, provide parent client devices little control or information regarding application activity associated with a child account. Some conventional systems provide some visibility to parental user interfaces, for example, with regards to requests for adding contacts to the child account. However, conventional systems provide few insights, if any, regarding other application activity. Accordingly, conventional systems can leave client devices of the most susceptible users exposed to a variety of digital security threats.

In addition to the technical problems just described, conventional systems are also inefficient. Indeed, conventional systems often require increased user interactions and unnecessary utilization of computer resources. For example, conventional systems often necessitate an inordinate amount of user interactions and user interfaces to perform safeguarding actions and/or monitor application activity. This can include duplicative log-in authentication procedures, multiple applications or application sessions, duplicative user interfaces (e.g., accessing different digital messaging threads, scrolling through different messages, accessing different history interfaces), and even access to multiple client devices (e.g., comparing parent devices and child devices). Conventional systems expend significant computational resources and time managing repetitive log-in procedures, processing excessive user interactions, providing duplicative user interfaces, and responding to requests from multiple different client devices.

Conventional systems also suffer from inefficiencies in controlling contacts of client devices corresponding to children or dependent users. Indeed, in arranging digital contacts for communication systems, parent client devices are often overwhelmed with digital requests to approve digital contacts corresponding to a dependent user. In addition, conventional systems often require excessive user interactions to add contacts for dependent users with regard to online interactive groups. Indeed, for a set of dependent user accounts to add contacts in forming an online interactive group, conventional systems require duplicative searching and identification (by each parent device) of all contacts corresponding to the group in addition to duplicative parental approval of each contact. This approach requires excessive user interactions, time, and processing resources.

These technical problems, among others, exist with regard to conventional systems.

BRIEF SUMMARY

Embodiments of the present disclosure provide benefits and/or solve one or more of the foregoing or other problems in the art with systems, non-transitory computer-readable media, and methods that improve functionality, security, and efficiency by dynamically monitoring digital activity of dependent client devices to generate and provide a comprehensive, dynamic activity dashboard for display within a graphical user interface of a managing client device. In particular, the disclosed systems can intelligently display, within the activity dashboard, digital communications, digital complaints, and digital media items to provide critical insights regarding digital activity of a dependent messaging account (e.g., a messaging account corresponding to a child or minor) within a single user interface of a managing client device (e.g., a client device of a parent or guardian). In addition, the disclosed systems can provider user interfaces for delegating contact-control privileges from managing accounts to trusted contact client devices to further improve efficiency, flexibility, and security in managing online contacts for dependent client devices.

For example, the disclosed systems can monitor digital activity across dependent client devices with regard to contacts and groups, contact updates, digital communications, and digital media items exchanged between client devices and/or messaging accounts. In turn, the disclosed system can selectively surface digital activity indicators in the activity dashboard along with actionable options to modify information or activities available to the dependent client device. For instance, based on user input via the activity dashboard, the disclosed systems can report and/or remove (e.g., delete or hide) digital media items from a messaging thread view of the dependent client device. Thus, using the activity dashboard, the disclosed systems can apply user interactions via parent devices to regulate viewable content and digital communications of a dependent account with other dependent accounts.

Moreover, as mentioned above, the disclosed systems can further improve efficiency and flexibility by providing options to share dynamic contact-control privileges with trusted contact accounts. In particular, the disclosed systems can provide user interfaces at managing client devices to delegate contact-control privileges to trusted contact client devices, allowing the trusted contact client devices to manage contacts available to dependent client devices in generating online interactive messaging groups for dependent user accounts. Utilizing trusted contact client devices with delegated contact-control privileges, the disclosed systems can efficiently, flexibly, and securely add contacts to dependent client devices and manage online interactive groups for dependent user accounts.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIGS. 5A-5C illustrate user interfaces on a managing computing device for presenting an activity dashboard in accordance with one or more embodiments.

FIGS. 6A-6C illustrate user interfaces on a managing computing device for presenting an activity dashboard in accordance with one or more embodiments.

DETAILED DESCRIPTION

Figure 1:
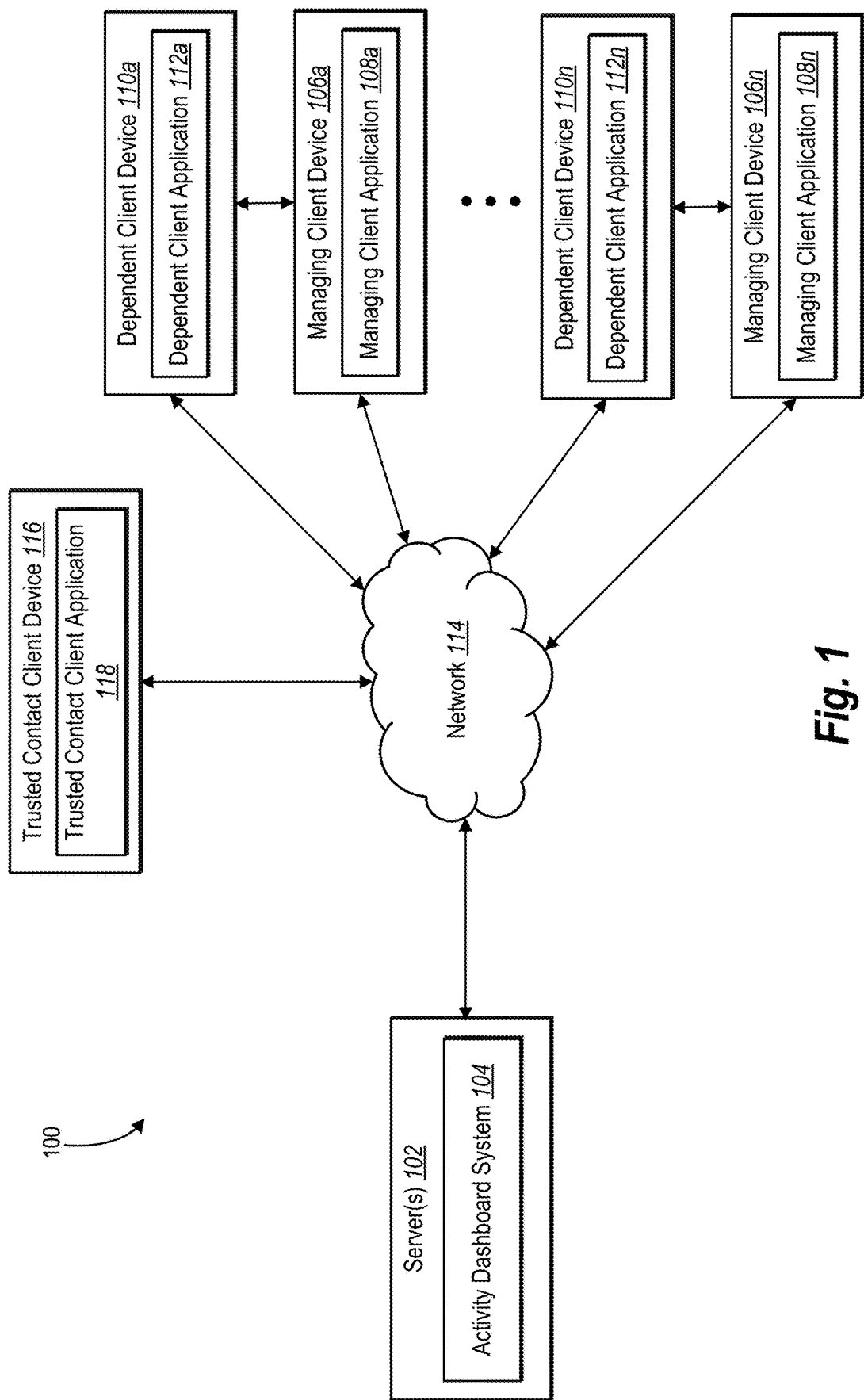
FIG. 1 illustrates a diagram of a computing system environment including an activity dashboard system in accordance with one or more embodiments.

This disclosure describes one or more embodiments of an activity dashboard system that can monitor digital activity of dependent client accounts to generate and provide a dynamic activity dashboards for display within a graphical user interface of a managing client device associated with a managing account. In addition, the activity dashboard system can also provider user interfaces for delegating contact-control privileges from managing accounts to trusted contact client devices, allowing trusted contact client devices to manage contacts and online interactive groups corresponding to dependent accounts. Accordingly, the activity dashboard system can provide efficient activity dashboards and user interfaces that improve flexibility and security in managing and monitoring online activity of dependent client devices and corresponding dependent accounts.

For example, the activity dashboard system can intelligently monitor digital activity in an application associated with a dependent account linked to a managing account. From the monitored digital activity, the activity dashboard system can selectively surface indicators to the activity dashboard in an efficient manner that allows for the managing client device to review and/or apply actions to control digital content and functionality at the dependent client device. For example, the activity dashboard system can provide digital communications fields, digital complaint fields, and/or digital media item fields that indicate digital communications, complaints, and media items exchanged with regard to a dependent client device and/or dependent messaging account. Moreover, the activity dashboard system can provide selectable options at the managing client device to modify the dependent messaging account. For instance, the activity dashboard system can provide selectable options for removing (or reporting) digital content from messaging threads or removing (or reporting) digital contacts.

As suggested above, the activity dashboard system can generate a variety of interactive user accounts, including managing accounts and dependent accounts. Specifically, the activity dashboard system can generate a managing account (e.g., a parent or guardian account) that is linked to a dependent account (e.g., a child or minor account). The activity dashboard system can provide certain managing privileges to the managing account and restrict/withhold certain activities, information, or privileges from dependent accounts. For example, when a managing account logs into a managing client device, the activity dashboard system can provide access to permissions, contact-control privileges, and one or more activity dashboards corresponding to the dependent account. Similarly, when a dependent account logs into a dependent client device, the activity dashboard system can provide access to digital communications and messaging capabilities but withhold privileges to unilaterally add contacts or access restricted digital content.

As just mentioned, the activity dashboard system can monitor digital activity of a dependent messaging account linked to a managing account. In some embodiments, monitoring digital activity of a dependent messaging account may include tracking digital communications between the dependent messaging account and other messaging accounts. For example, the activity dashboard system may track the respective number of instant messages or video chats between the dependent client device and third-party client devices (or between the dependent messaging account and other dependent messaging accounts on the same or different client devices). As another example, monitoring digital activity of a dependent messaging account may include tracking digital complaints comprising blocked/reported contacts or digital media items. In yet another example, monitoring digital activity of a dependent messaging account may include tracking digital media items exchanged in messaging chat threads.

Furthermore, as indicated above, the activity dashboard system can also generate and provide an activity dashboard to the managing client device reflecting digital activity of the dependent account. Specifically, in some embodiments the activity dashboard system can provide a digital communications field (including indicators of digital communications exchanged with a dependent messaging account), a digital complaint field (indicating reported or blocked contacts or digital content corresponding to the dependent messaging account), and a digital media item field (indicating digital media items exchanged with the dependent messaging account). In addition, the activity dashboard can also include a variety of additional notifications, anomaly indicators, etc.

In one or more embodiments, the activity dashboard system can intelligently determine what indicators to provide (and in what order) within the activity dashboard. In particular, the activity dashboard system can utilize a surfacing model to analyze a variety of features, including monitored activity at other dependent client devices and other managing devices, to decide what indicators to include within the activity dashboard. To illustrate, the activity dashboard system can monitor digital activity (e.g., content shared, reported, blocked, or removed) across a variety of dependent client devices and monitoring client devices. The activity dashboard system can analyze this activity utilizing a surfacing model (e.g., a machine learning and/or heuristic model) to select what digital communications, digital complaints, and digital media items to surface to an activity dashboard (and in what order).

Moreover, as mentioned above, the activity dashboard system can also provide selectable elements via an activity dashboard for modifying information or functionality available to a dependent account and dependent client device. For example, for each of the user interface elements in the activity dashboard, the activity dashboard system can, in response to user interaction, present selectable options to modify a dependent messaging account. For example, the activity dashboard system may remove or report messaging thread content at the request of the managing client device (e.g., based on a digital media item surfaced in the digital media item field of the activity dashboard). As another example, the activity dashboard system may remove, block, or report a contact of the dependent messaging account at the request of the managing client device (e.g., based on a reported message surfaced in the digital complaint field of the activity dashboard).

In addition, as briefly discussed above, the activity dashboard system can also provide interfaces and options for delegating contact-control privileges to trusted contact accounts. Indeed, in generating a managing account, the activity dashboard system can provide contract-control privileges for a dependent account to a managing account. The activity dashboard system can provide user interfaces that allow a managing client device to delegate these contact-control privileges (in whole or in part) to another trusted contact account. Furthermore, the activity dashboard system can provider user interfaces that allow a trusted contact client device to modify contacts for dependent accounts. For example, the activity dashboard system can utilize delegated contact-control privileges at a trusted contact account to add dependent accounts to an online group, modify contact lists of corresponding dependent accounts, and allow dependent accounts within the group to transmit digital communications across dependent client devices.

As mentioned above, the activity dashboard system can provide several technical advantages over conventional systems. For example, the activity dashboard system can provide a managing client device increased levels of control and functionality with regard to a dependent messaging account. In particular, by generating and providing an activity dashboard at a managing client device, the activity dashboard system can provide managing devices critical information regarding dependent accounts and allow managing devices to directly take action to modify dependent accounts and dependent client devices. For example, via the activity dashboard, the activity dashboard system can detect user interaction via a managing client device to directly remove thread content (e.g., hide or delete a digital media item) from a messaging thread view of the dependent messaging account. Similarly, based on user interaction with the activity dashboard at a managing client device, the activity dashboard system can report thread content (e.g., a message) and block contacts from the dependent messaging account.

In addition, the activity dashboard system can improve security relative to conventional systems. In particular, the activity dashboard system can provide numerous digital activity insights to detect and resolve security threats such as phishing schemes, digital pirates, or online criminals. For example, the activity dashboard can include indicators that reflect digital communications, digital complaints (with regard to other accounts or specific digital communications), or digital media items transmitted to a dependent client device. The activity dashboard system can intelligently present these indicators (and corresponding security notifications, where appropriate) to allow managing client devices to quickly and efficiently identify potential threats. In addition, the activity dashboard system can provide other insights, such as anomaly detection or visualizations. These and other insights allow managing client devices to detect and resolve security threats presented to dependent client devices.

The activity dashboard system can also improve efficiency relative to conventional systems. In particular, the activity dashboard system can provide a user interface that includes an activity dashboard that decreases user interactions, duplicative user interfaces, and computing resources needed to review digital activity of a dependent messaging account and implement responsive actions. Indeed, the activity dashboard system can provide a single user interface that manages dependent messaging accounts through efficient user interactions. This approach stands in contrast to conventional systems that typically require opening and navigating through multiple applications (e.g., a parent application and child application), duplicative log-in routines, and excessive user inputs with regard to multiple user interfaces (e.g., separate messaging threads, history tabs, etc.). In addition, by providing the above-mentioned visibility of digital activity and improved control/functionality all within a single user interface, the activity dashboard system improves the speed of interface navigation on client device screens (e.g. mobile devices).

Moreover, the activity dashboard system can further improve efficiency and flexibility relative to conventional systems by securely disseminating dynamic contact-control privileges from managing accounts to trusted contact accounts. Indeed, the activity dashboard system can allow a trusted contact account to obtain contact-control privileges (based on permission from a managing account) and then efficiently manage contacts of dependent accounts. For example, a trusted contact account of a coach or youth leader can securely and safely add dependent accounts to an online communication group by receiving contract-control privileges from managing accounts corresponding to managing client devices. In contrast to conventional systems (that require a plurality of parent devices to repeatedly search out, identify, and manage contacts for a plurality of dependent accounts), the activity dashboard system allows managing client devices to efficiently delegate contact-control permissions to a common trusted contact account (e.g., corresponding to a trusted contact that knows the dependent users), and the trusted contact account can modify the contacts of the dependent accounts to add them to a common communication group. This approach significantly reduces the user interactions, time, and processing resources required to manage contacts across dependent accounts.

As illustrated by the foregoing discussion, the present disclosure utilizes a variety of terms to describe features and advantages of the activity dashboard system. Additional detail is now provided regarding the meaning of such terms. For example, as used herein, the term "activity dashboard" refers to one or more graphical user interface elements for presenting digital information regarding a dependent account or dependent client device. In particular, an activity dashboard can include one or more graphical user interface (GUI) elements reflecting digital activity of a dependent messaging account. For example, the activity dashboard may include a digital communications field, a digital complaint field, and a digital media item field.

As further used herein, the term "dependent messaging account" refers to a user account linked to (or associated with) a managing account. A dependent messaging account can have limited functionality or privileges relative to the managing account. In particular, a dependent messaging account can include a social networking system (or communication system) user account connected to a managing account (e.g., a user account with privileges to monitor and modify the dependent messaging account). In some embodiments, the dependent messaging account can correspond to a user, such as a child, minor, or other type of dependent. Moreover, a dependent messaging account can be associated with a dependent client device (e.g., a client device of a dependent user). In particular, a dependent client device can include a device that a dependent user has logged into using credentials associated with the dependent messaging account.

As used herein, the term "managing account" refers to a user account with access, privileges, controls, or permissions with regard to a dependent messaging account. In particular, a managing account can include a social networking system (or communication system) user account linked to a dependent messaging account, such that the managing account can monitor digital activity corresponding to the dependent account and/or control digital content accessible by the dependent account. Additionally, in some embodiments, the managing account can correspond to a user, such as a parent, guardian, etc. Moreover, a managing account can be associated with a managing client device (e.g., a client device of a managing user). In particular, a managing client device can include a device that a managing user has logged into using credentials associated with the managing account.

As similarly used herein, the term "trusted contact account" refers to a user account with access, privileges, controls, or permissions granted for limited use in regard to a dependent messaging account. In particular, a trusted contact account can utilize "contact-control privileges" (e.g., contact-based permissions to add and/or remove contacts of a dependent messaging account) for connecting and managing a group of dependent messaging accounts. Examples of a trusted contact account can include a user account of a teacher, coach, youth leader, etc. that parents/guardians know and trust.

As also used herein, the term "digital activity" refers to computer-implemented actions in a computer network environment or computer application. In particular, digital activity can include acts, events, or occurrences within a communication system and/or social networking system that are associated with a dependent messaging account. Examples of digital activity can include digital communications (e.g., instant messages, video chats, etc.), digital complaints (e.g., requests to block or report content/contacts), and exchanged digital media items (e.g., images, videos, stickers, GIFs, games, augmented reality masks, art, etc.).

The term "field" refers to a user interface entry element that can be populated with other user interface elements. In particular, a field can include GUI elements associated with digital activity of a dependent messaging account. As an example, a field may include a digital communications field (e.g., for displaying indicators of digital communications between a dependent client device and third-party client devices or, more generally, between the dependent messaging account and another messaging account). As another example, a field may include a digital complaint field (e.g., for displaying indicators of digital complaints from the dependent client device regarding digital activity of one or more other messaging accounts). In yet another example, a field may include a digital media item field (e.g., for displaying digital media items exchanged between the dependent client device and at least one third-party client device or, more generally, between the dependent messaging account and another messaging account). In other cases, a field may be empty (e.g., where there is no corresponding digital activity).

As also used herein, the term "messaging thread" refers to a set of digital communications exchanged between client devices. In particular, a messaging thread can include a viewable exchange of digital communications within a user interface. An example of a messaging thread may include one or more of instant messages, digital media items, etc. exchanged between a dependent client device and at least one third-party dependent client device. Another example of a messaging thread may include one or more instant messages, digital media items, etc. exchanged between a dependent messaging account and another messaging account (e.g., between dependent messaging accounts sharing the same dependent client device, or between a dependent messaging account and an adult messaging account). Where more than two dependent client devices are included in a messaging thread, the messaging thread may correspond to a group messaging thread.

In addition, as used herein, the term "indicators" refers to a graphical representation within a user interface. In particular, indicators can include graphical representations within an activity dashboard that reflect digital activity in a dependent messaging account. One example of an indicator includes a count element (e.g., a number of instances of a digital activity). Another example of an indicator includes an identifying description associated with a digital activity (e.g., information describing or including a digital communication, digital media item, account identifier, messaging thread name, timestamp, sender/recipient device(s), etc.).

Additional detail will now be provided regarding the activity dashboard system in relation to illustrative figures portraying example embodiments and implementations of the cognitive attribute classification system. For example, FIG. 1 illustrates a computing system environment (or "environment") 100 for implementing an activity dashboard system 104 in accordance with one or more embodiments. As shown in FIG. 1, the environment 100 includes server(s) 102, managing client devices 106a-106n (collectively, managing client devices 106), corresponding dependent client devices 110a-110n (collectively, dependent client devices 110), a network 114, and a trusted contact client device 116. Each of the components of the environment 100 can communicate via the network 114, and the network 114 may be any suitable network over which computing devices can communicate. Example networks are discussed in more detail below in relation to FIG. 11.

As shown in FIG. 1, the environment 100 includes the managing client devices 106 and dependent client devices 110. The managing client devices 106 and the dependent client devices 110 can be one of a variety of computing devices, including a smartphone, tablet, smart television, desktop computer, laptop computer, virtual reality device, augmented reality device, or other computing device as described in relation to FIG. 11. Although FIG. 1 illustrates multiple managing client devices 106 and dependent client devices 110, in some embodiments the environment 100 can include a single managing client device and/or a single dependent client device. The managing client devices 106 and the dependent client devices 110 can further communicate with the server(s) 102 via the network 114. For example, the dependent client device 110a can provide user input to report a digital media item received from the dependent client device 110n. In turn, the dependent client device 110a can transmit, to the activity dashboard system 104 via the network 114, an indication of the user input to report the digital media item.

As a further example, the managing client device 106a can, via the network 114, request that the activity dashboard system 104 remove the reported digital media item from the dependent messaging account and/or a messaging thread view of the dependent client device 110a. For instance, in some embodiments, the activity dashboard system 104 may remove thread content by hiding digital content (at the server(s) 102) from a particular account or dependent client device. To illustrate, the activity dashboard system can remove access/viewing privileges to specific digital content in a messaging thread stored at the server(s) 102 from a dependent account. In other embodiments, the activity dashboard system may remove thread content by deleting digital content from the particular account or dependent client device.

In these or other embodiments, the terms "report" (or "reporting") can generally refer to a computer-implemented act of flagging, highlighting, or calling attention to at an item (e.g., to a digital communication system, a social networking system, or co-users). In one example, reporting can include a request to notify others of questionable, offensive, inappropriate, unsafe, or threatening digital activity and/or conduct. In another example, reporting can further include a request to block (e.g., prevent further communication to/from) a particular contact.

As shown, the managing client devices 106 include a corresponding managing client application 108a-108n (collectively, managing client applications 108). Likewise, the dependent client devices 110 include a corresponding dependent client application 112a-112n (collectively, dependent client applications 112). In particular, the managing client applications 108 and the dependent client applications 112 may be a web application, a native application installed on a respective client device (e.g., a mobile application, a desktop application, etc.), or a cloud-based application where part of the functionality is performed by the server(s) 102. The managing client applications 108 and the dependent client applications 112 can present or display information to a user respectively associated with the managing client devices 106 and the dependent client devices 110. For example, the managing client applications 108 can display an activity dashboard. In addition, managing users can interact with the managing client applications 108 to provide user input to, for example, modify a dependent messaging account as displayed according to the dependent client applications 112 on the dependent client devices 110.

As shown in FIG. 1, the environment 100 includes the trusted contact client device 116. The trusted contact client device 116 can be one of a variety of computing devices as described above. As further shown, the trusted contact client device 116 includes a trusted contact client application 118 similar to the managing client applications 108 and the dependent client applications 112 discussed above. In particular, the trusted contact client application 118 can provide information for display on the trusted contact client device 116 regarding contact-control privileges for connecting and managing a group of dependent messaging accounts. Specifically, the trusted contact client device 116 can communicate with the managing client devices 106 to request or otherwise obtain contact-control privileges for adding and/or removing contacts from dependent messaging accounts. For example, the trusted contact client device 116 can create a networking group (e.g., a digital communications group, a social networking group) and add a dependent messaging account to the networking group based on the contact-control privileges.

As illustrated in FIG. 1, the environment 100 includes the server(s) 102. The server(s) 102 may learn, generate, execute, process, store, receive, and transmit electronic data, such as executable instructions for monitoring digital activity of dependent messaging accounts associated with the dependent client devices 110. In particular, the server(s) 102 can generate a dependent messaging account associated with a dependent client device (e.g., the dependent client device 110a). The server(s) 102 can then link the dependent messaging account to a managing account corresponding to a managing client device (e.g., the managing client device 106a). In addition, the server(s) 102 can identify user interactions associated with the managing client devices 106. Further, the server(s) 102 can intelligently determine an arrangement of digital activity to surface in an activity dashboard, for example, based on the monitored digital activity and the identified user interactions. Consistent with the intelligent determination of digital activity to surface, the server(s) 102 can then provide respective activity dashboards to the managing client devices 106. Responsive to user input at the activity dashboards of the managing client devices 106, the server(s) 102 can, in turn, modify corresponding dependent messaging accounts associated with the dependent client devices 110.

In addition the server(s) 102 can manage accounts of a networking system. In these or other embodiments, the terms "account" or "user account" can generally refer to a collection of information and associated permissions, privileges, data, etc. regarding a user of a networking system (e.g., a digital communications system, a social networking system). In particular, the server(s) 102 can maintain a list of contacts for each user account (e.g., friends that a user adds or has previously added). Each contact has certain privileges, rights, and/or access to digital information by virtue of being on a contact list. For example, a contact of a user account can see social media posts of the user account, send/receive instant messages from the user account, share digital media items with the user account, etc. In addition, the server(s) 102 can add and/or remove contacts from a contact list.

In these or other embodiments, the server(s) 102 can communicate with the managing client devices 106, the dependent client devices 110, and the trusted contact client device 116 to transmit and/or receive data via the network 114. In some embodiments, the server(s) 102 comprises a content server and/or a data collection server. The server(s) 102 can also comprise an application server, a communication server, a web-hosting server, a social networking server, or a digital content management server.

Although FIG. 1 depicts the activity dashboard system 104 located on the server(s) 102, in some embodiments, the activity dashboard system 104 may be implemented by on one or more other components of the environment 100 (e.g., by being located entirely or in part at one or more of the other components). For example, activity dashboard system 104 may be implemented by the managing client devices 106, the dependent client devices 110, and/or a third-party device.

In some embodiments, though not illustrated in FIG. 1, the environment 100 may have a different arrangement of components and/or may have a different number or set of components altogether. For example, the environment 100 may include a third-party server. As another example, the managing client devices 106 and/or the dependent client devices 110 may communicate directly with the activity dashboard system 104, bypassing the network 114.

Although the description herein sometimes refers to a single device corresponding to an individual account, the activity dashboard system 104 can associate a variety of different client devices with any particular account. For example, a managing account may be associated with multiple managing client devices. To illustrate, a parent may use a cell phone, a tablet device, and a laptop computer to access a managing account. Each of the cell phone, the tablet device, and the laptop would constitute managing devices corresponding to the managing account. Similarly, a dependent account may be associated with multiple dependent devices (e.g., a child may have a cell phone and a tablet utilized to communicate with others). Accordingly, reference to a managing client device or a dependent client device herein can refer to any of multiple managing client devices or dependent client devices associated with a corresponding managing account or dependent account.

Further, in some embodiments, the activity dashboard system 104 can associate multiple accounts with a single device. For example, the activity dashboard system 104 can associate multiple dependent messaging accounts with a single dependent client device (e.g., for siblings sharing a same dependent client device). Moreover, in some embodiments, the activity dashboard system 104 can associate multiple dependent messaging accounts with one or more managing accounts. Accordingly, the activity dashboard system 104 can intelligently provide digital activity of multiple dependent messaging accounts to one or more managing accounts in a same or similar manner as described in the present disclosure. Likewise, the activity dashboard system 104 can associate multiple managing accounts with one or more dependent messaging accounts. In this manner, the activity dashboard system 104 can flexibly arrange and/or modify a variety of component configurations and relationships to account for myriad different implementations of the computing environment 100.

Figure 2:
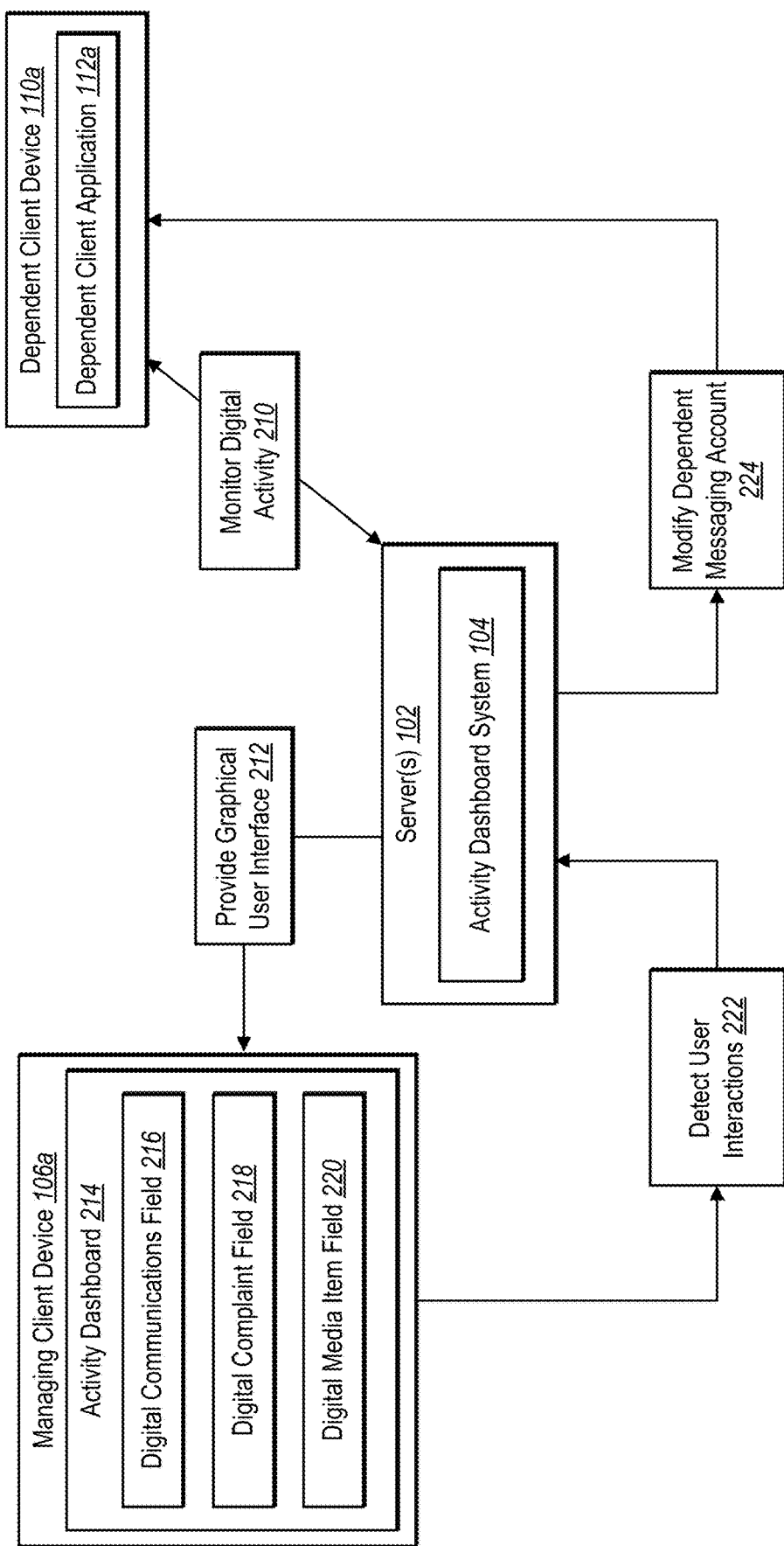
FIG. 2 illustrates an activity dashboard system modifying a dependent messaging account in accordance with one or more embodiments.

As mentioned above, the activity dashboard system 104 can modify a dependent messaging account based on monitored digital activity in the dependent messaging account and identified user interactions from a managing client device. FIG. 2 illustrates the activity dashboard system 104 modifying a dependent messaging account in accordance with one or more embodiments. In particular, FIG. 2 shows the activity dashboard system 104 monitoring digital activity at an act 210, providing a GUI (e.g., an activity dashboard 214) at an act 212, detecting user interactions at an act 222, and modifying a dependent messaging account at an act 224.

In more detail, the activity dashboard system 104 at the act 210 can track one or more digital communications, digital complaints, and/or digital media items. For example, the activity dashboard system 104 can track digital communications by tracking the respective number of instant messages or video chats between messaging accounts (e.g., that correspond to the dependent client device 110*a* and third-party client devices associated with third-party dependent messaging accounts). Additionally, in some embodiments, the activity dashboard system 104 may track attributes and/or statistics associated with the monitored digital communications, such as frequency, average session duration, communication start/end times, etc. Further, in some embodiments, the activity dashboard system 104 may track whether a digital communication has been reported (or was sent by a contact that has previously been reported).

In addition to digital communications, the activity dashboard system 104 can also track digital complaints at the act 210. For example, the activity dashboard system 104 can track digital complaints by tracking reports of contacts and/or digital media items. To illustrate, the activity dashboard system 104 can identify a dependent messaging account associated with a reported contact and/or digital media item(s) (e.g., reported for containing inappropriate or offensive behavior). As with the digital communications, the activity dashboard system 104 can also track various attributes and/or statistics associated with the digital complaints (e.g., an average frequency of reporting contacts and/or digital media items, identified reporting causes, etc.). In addition, the activity dashboard system 104 can request a reporting reason from the dependent client device 110*a* (e.g., a user interface prompt requesting a free-response, multiple-choice, or other answer type) to inform the activity dashboard system 104 of the reporting cause. If the dependent client device 110*a* does not provide a reporting cause, the activity dashboard system 104 may predict the reporting cause (e.g., using a machine-learning model trained to predict reporting causes).

The activity dashboard system 104 may also track digital media items exchanged between the dependent client device 110a and third-party dependent client devices in digital communications (or more generally, digital communications between messaging accounts on one or more client devices). For example, the activity dashboard system 104 may track digital media items exchanged in instant messages between the dependent client device 110a and third-party dependent client devices by extracting digital media items from messaging threads. To extract digital media items, the activity dashboard system 104 may identify a digital media item and store a copied/approximated version of the digital media item. In particular, extraction may include identifying a digital media item by file type (e.g., a JPG, TIFF, PNG, GIF, etc.), associated metadata (e.g., data tags indicative of content), and/or by visual assessment (e.g., according to image classifiers or machine-learning models trained to identify images). Additionally or alternatively, the activity dashboard system 104 may identify a digital media item by detecting links (e.g., hyperlinks), location data (e.g., source data of an object), interactive elements (e.g., games), etc. In turn, the activity dashboard system 104 may complete the extraction process for tracking digital media items by copying (or in some cases reproducing an approximated version of) the identified digital media item for storage and/or transmission to the managing client device 106a.

Based on the monitored digital activity at the act 210, the activity dashboard system 104 can provide a GUI (i.e., that includes the activity dashboard 214) to the managing client device 106a at the act 212. One or more aspects of the act 212 are described in further detail below (e.g., in relation to FIG. 3). For example, the activity dashboard system 104 can intelligently select and surface indicators of monitored digital activity. In general, however, the activity dashboard system 104 at the act 212 can vary an arrangement of GUI elements and selectively surface the monitored digital activity to the managing client device 106a in the activity dashboard 214.

Figure 3:
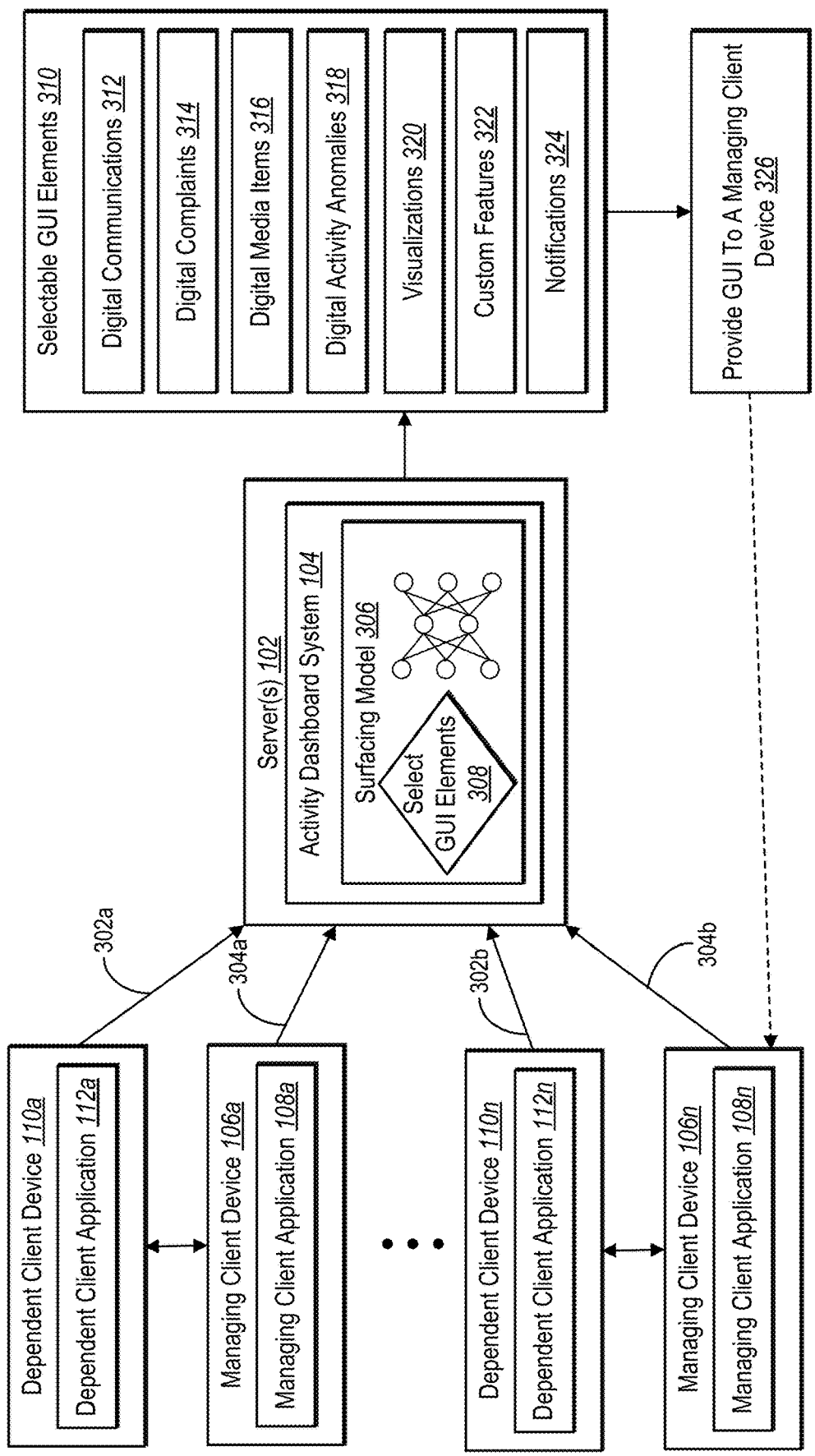
FIG. 3 illustrates an activity dashboard system utilizing a surfacing model to intelligently select user interface elements to provide to a managing client device in accordance with one or more embodiments.
Figure 4B:
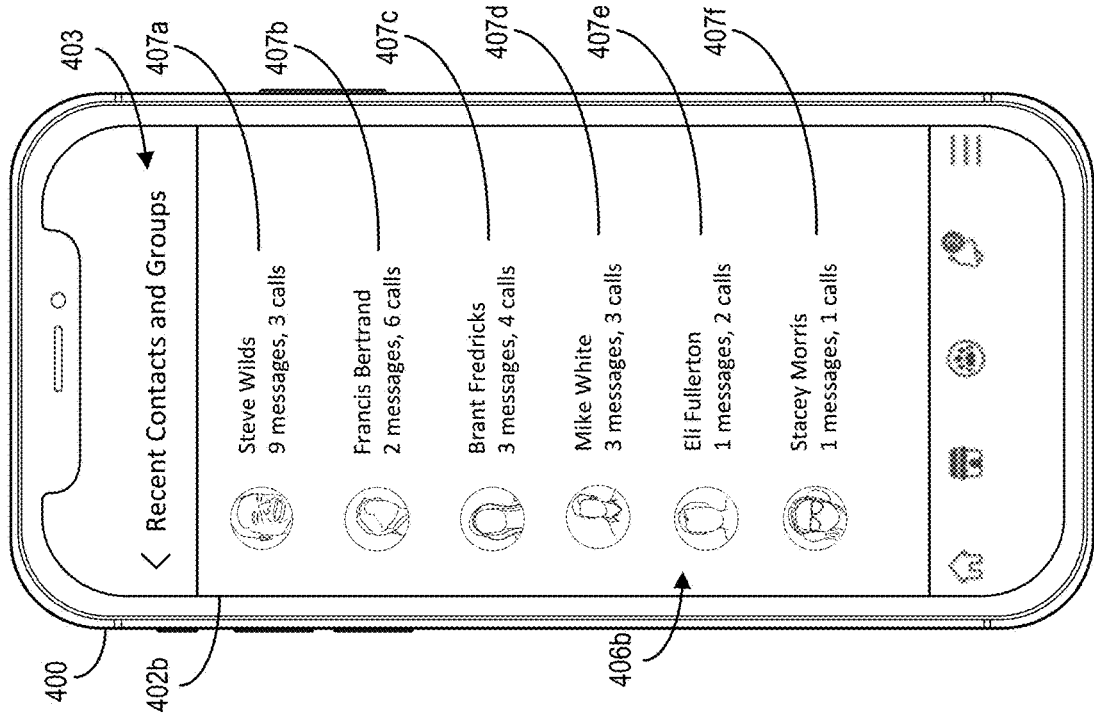
FIGS. 4A-4B illustrate user interfaces on a managing computing device for presenting an activity dashboard in accordance with one or more embodiments.
Figure 4A:
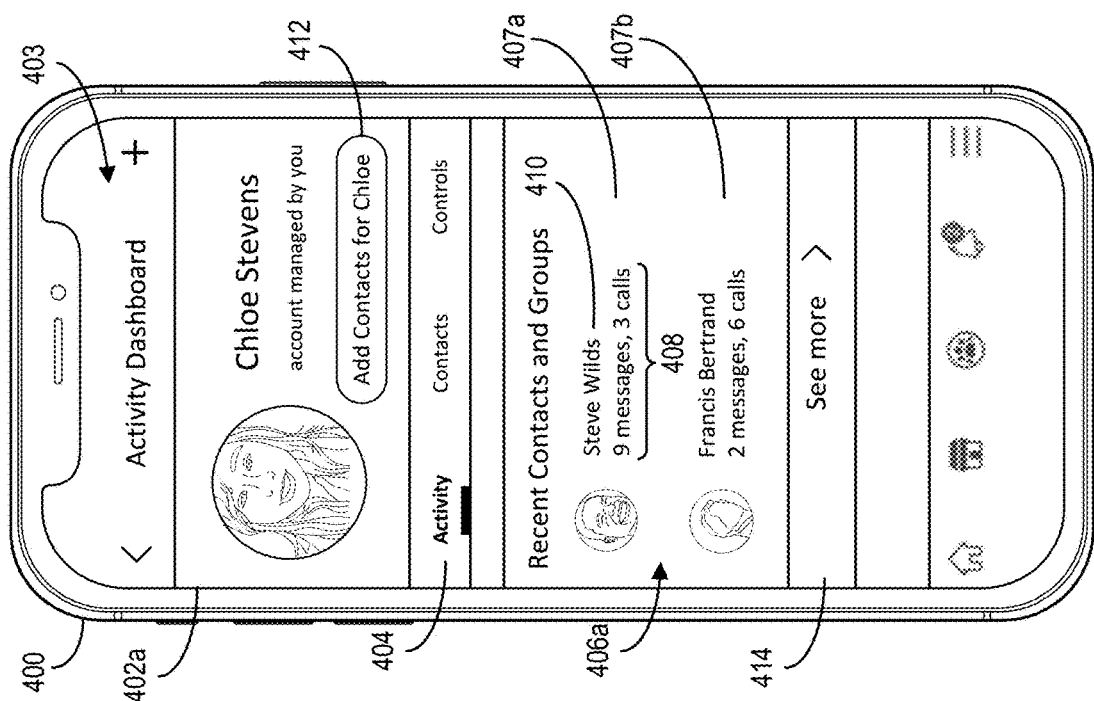

As shown in FIG. 2, the activity dashboard 214 comprises a digital communications field 216, a digital complaint field 218, and a digital media item field 220. In some embodiments, the digital communications field 216, the digital complaint field 218, and the digital media item field 220 are GUI elements configured for populating indicators in accordance with the monitored digital activity. In particular, the digital communications field 216 comprises one or more of the monitored digital communications. For example, the digital communications field 216 may include a listing of monitored digital communications that includes, for a given digital communication, one or more corresponding messaging accounts and a count element reflecting a number and type of digital communications (e.g., as shown in FIGS. 4A-4B). In some embodiments, the activity dashboard system 104 may arrange the digital communications field 216 as comprising monitored digital communications in the order they occurred (e.g., most recent listed at top). However, as described in more detail below in relation to FIG. 3, the activity dashboard system 104 can dynamically alter the digital communications field 216 to show a different arrangement of monitored digital communications.

In addition, the digital complaint field 218 comprises one or more of the monitored digital complaints. For example, the digital complaint field 218 may similarly include a listing of monitored digital complaints that includes, for a given digital complaint, a reporting action and a corresponding messaging account (e.g., as shown in FIGS. 5A-5B). The reporting action may detail aspects of the report, including whether the dependent client device 110a reported a digital media item, a digital communication, and/or a third-party dependent messaging account. In some embodiments, the digital complaint field 218 can also include updates or subsequent actions taken in regard to a previous reporting action, such as unblocking a third-party dependent messaging account that the dependent client device 110a previously blocked. In these or other embodiments, the activity dashboard system 104 may arrange the digital complaint field 218 comprising digital complaints and/or digital complaint updates in reverse chronological order (e.g., most recent listed at top). However, as described in more detail below in relation to FIG. 3, the activity dashboard system 104 can dynamically alter the digital complaint field 218 to show a different arrangement of digital complaints or digital complaint updates.

The digital media item field 220 comprises one or more of the monitored digital media items exchanged in digital communications. The digital communications may be between the dependent messaging account of the dependent client device 110a and other messaging accounts (e.g., other messaging accounts corresponding to the same dependent client device 110a and/or other third-party dependent client devices). For a given digital media item in the digital media item field 220, the activity dashboard system 104 may indicate a sender device, a recipient device, a messaging thread name (e.g., for group messaging threads), and/or a timestamp (e.g., as shown in FIG. 6A). As with the digital communications field 216 and the digital complaint field 218, the activity dashboard system 104 can arrange the digital media item field 220 in reverse chronological order (e.g., most recent listed at top). However, as described in more detail below in relation to FIG. 3, the activity dashboard system 104 can dynamically alter the digital media item field 220 to show a different arrangement of digital media items.

At the act 222, the activity dashboard system 104 can detect user interactions in the activity dashboard 214 with one or more elements of the digital communications field 216, the digital complaint field 218, and/or the digital media item field 220. For example, as described more below in relation to FIGS. 4A-4B, the activity dashboard system 104 may detect a user interaction to "see more" digital communications, digital complaints, or digital media items in an expanded view of the digital communications field 216, the digital complaint field 218, or the digital media item field 220. Additionally or alternatively, the activity dashboard system 104 may detect a user interaction with a given digital communication to report a third-party dependent messaging account and/or see more details or attributes about the digital communication or the third-party dependent messaging account. Similarly, at the act 222, the activity dashboard system 104 can detect user interactions with a given digital complaint to report and/or remove a third-party dependent messaging account as a contact of the dependent client device 110a. Additionally or alternatively at the act 222, the activity dashboard system 104 can detect user interactions with a given digital media item to report and/or remove a digital media item from a messaging thread view of the dependent client device 110a.

In response to the detected user interactions at the act 222, the activity dashboard system 104 at the act 224 can modify the dependent messaging account associated with the dependent client device 110a. In particular, the activity dashboard system 104 at the act 224 can execute a request (in accordance with the detected user interaction) to report or remove digital media item(s) from a messaging thread view of the dependent client device 110a. Similarly, the activity dashboard system 104 at the act 224 can execute a request to report and/or remove a messaging account (e.g., associated with a third-party dependent client device or a shared dependent client device) as a contact of the dependent messaging account for the dependent client device 110a.

Figure 7B:
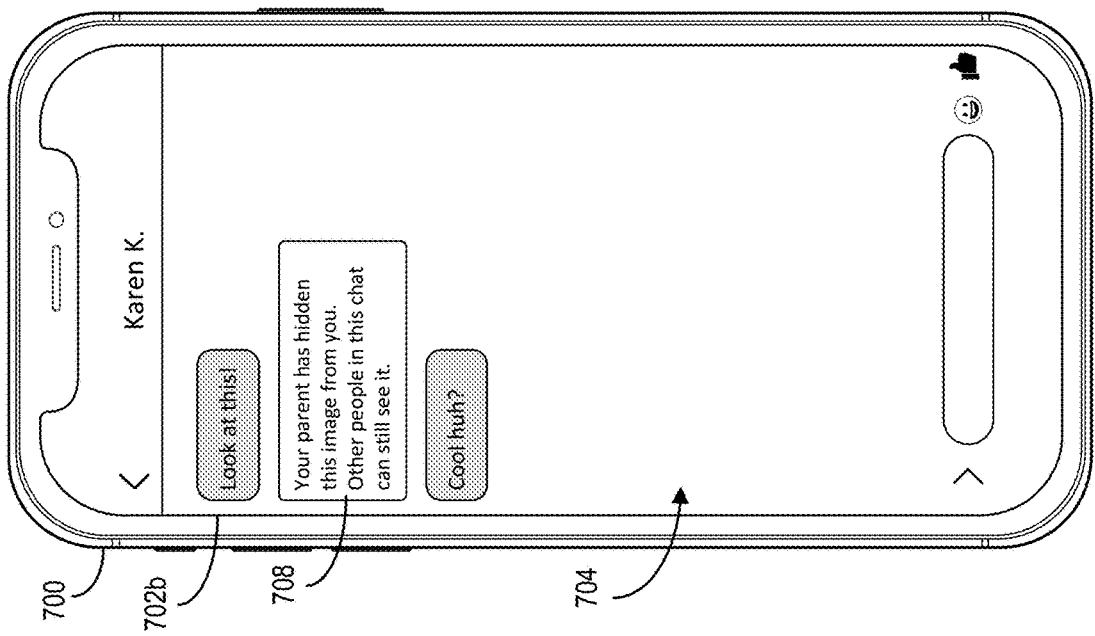
FIGS. 7A-7B illustrate user interfaces on a dependent computing device for presenting a messaging thread in accordance with one or more embodiments.
Figure 7A:
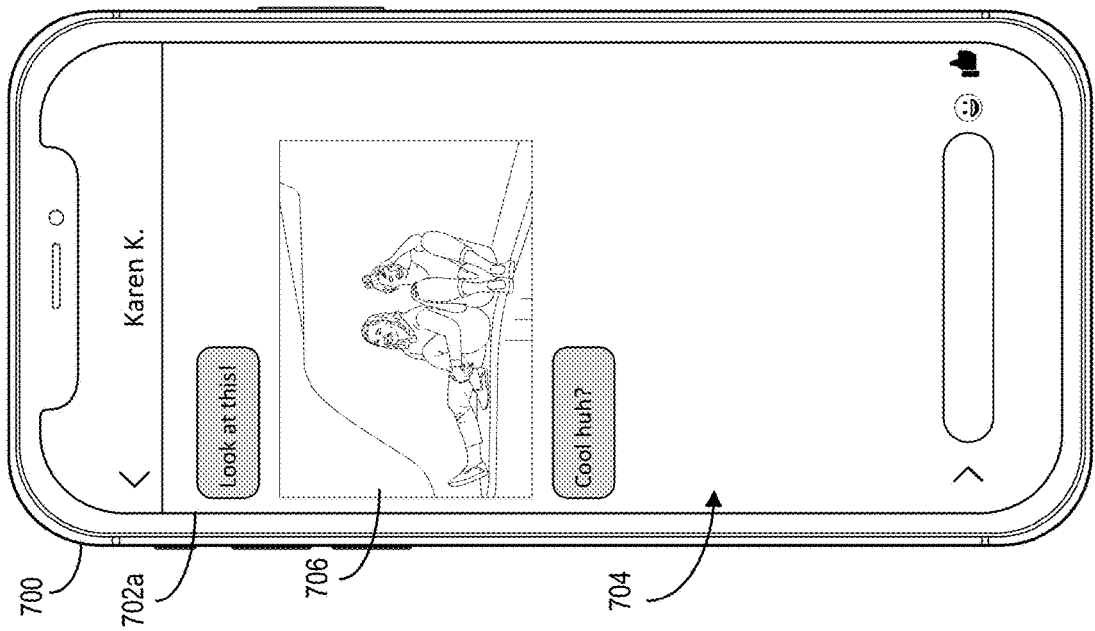

In these or other embodiments, the activity dashboard system 104 may update one or more user interfaces of the dependent client device 110a (via the dependent client application 112a) to indicate that the activity dashboard system 104 has modified the dependent messaging account. For example, the activity dashboard system 104 may update a user interface to indicate that the managing client device 106a has reported and/or removed a third-party dependent messaging account as a contact. Similarly, for example, the activity dashboard system 104 may update a messaging thread interface to show, in place of a removed digital media item, that the managing client device 106a has removed a digital media item from view (e.g., as shown in FIGS. 7A-7B).

As mentioned above, the activity dashboard system 104 can intelligently surface monitored digital activity of a dependent messaging account to a managing client device (e.g., as part of an activity dashboard). FIG. 3 illustrates the activity dashboard system 104 utilizing a surfacing model 306 to intelligently select GUI elements to provide to a managing client device in accordance with one or more embodiments. As shown, the activity dashboard system 104 receives digital activity data 302a-302b from the dependent client devices 110 and user interaction data 304a-304b from the managing client devices 106. Based on the digital activity data 302a-302b and the user interaction data 304a-304b, the activity dashboard system 104 utilizes a surfacing model 306 to intelligently identify (at an act 308) which of selectable GUI elements 310 the activity dashboard system 104 can provide to a managing client device at an act 326. The following description explains this process in relation to each of the selectable GUI elements 310, including when, how much of, and/or in what order to surface one of the selectable GUI elements 310 to the managing client device 106n via an activity dashboard. The activity dashboard system 104, however, can apply the same or similar acts and algorithms for providing respective GUIs to others of the managing client devices 106.

The activity dashboard system 104 can monitor the digital communications 312 via the digital activity data 302a-302b. For example, as described above in relation to FIG. 2, the digital activity data 302a-302b may include, among other things, the respective number of instant messages and/or video chats between messaging accounts (e.g., corresponding to the dependent client devices 110). In addition, the activity dashboard system 104 can detect user interactions via the user interaction data 304a-304b regarding digital communications in general, or regarding historical (e.g., prior-surfaced) digital communications between specific dependent messaging accounts and/or dependent client devices 110. For example, the user interaction data 304a may include a prior reporting action to report the dependent client device 110n for an excessive frequency of instant messages sent from the dependent client device 110n to the dependent client device 110a. As another example, the user interaction data 304a may include a prior reporting action to report an instant message received from another of the dependent client devices 110 (e.g., regarding a popular message or viral digital media item).

The surfacing model 306 at the act 308 can determine how many instances of the digital communications 312 to surface to the managing client device 106n. For example, in some embodiments, the surfacing model 306 may select a predetermined number of the digital communications 312 (e.g., two, three, six, etc.). Additionally or alternatively, the surfacing model 306 may select the digital communications 312 based on time (e.g., all digital communications within the past hour, day, week, month, etc.). Thus, in some embodiments, the digital communications 312 selected to surface to the managing client device 106n may vary depending on frequency and/or quantity of digital communications. Further, in some embodiments, the surfacing model 306 may modify the number of digital communications 312 for surfacing to the managing client device 106n based on others of the selectable GUI elements 310 that the surfacing model 306 elects to surface. For example, the surfacing model 306 may decrease the number of digital communications 312 to surface to the managing client device 106n to preserve display space within the provided GUI, increase readability, and/or emphasize digital communications warranting a prioritized review.

Further to a quantity of digital communications 312, the surfacing model 306 at the act 308 can determine an order (or priority) of the digital communications 312 to surface to the managing client device 106n. For example, in some embodiments, the surfacing model 306 may determine to surface the digital communications 312 in accordance with a time-based approach (e.g., reverse chronological order). Additionally or alternatively, the surfacing model 306 may determine to surface the digital communications 312 based on frequency (e.g., digital communications associated with higher frequencies are listed at the top). Further, in some embodiments, the surfacing model 306 may determine to prioritize the digital communications 312 involving contacts of interest (e.g., reported contacts, best-friends, favorite messaging threads, etc. are listed first).

For example, the user interaction data 304a may include a prior reporting action to report the dependent client device 110n for an excessive frequency of instant messages sent to the dependent client device 110a. Because the managing client device 106a reported the messaging behavior of the dependent client device 110n, the surfacing model 306 may choose to prioritize instances of the digital communications 312 between the dependent client device 110n and the dependent client device 110a. In another example, at least one of the digital activity data 302a-302b may include a reporting action against an account associated with one of the dependent client devices 110a, 110n. In turn, the surfacing model 306 may likewise choose to prioritize instances of the digital communications 312 between the dependent client device 110n and the dependent client device 110a.

In another example, the surfacing model 306 may choose to prioritize particular instances of the digital communications 312 at one managing client device based on similar (but independent) instances of the digital communications 312 being reported by another managing client device. To illustrate, the dependent client device 110n may receive a message "100 ways to tease your siblings" from a dependent client device 110k (not shown). The message, in some cases, is never reported by the communicating dependent client devices 110n, 110k (or the corresponding managing client devices 106n, 106k (not shown)).

The surfacing model 306 may nevertheless choose to prioritize surfacing the popular message in the digital communications 312 to the managing client device 106n. For example, the surfacing model 306 may choose to prioritize surfacing the popular message in the activity dashboard for the managing client device 106n based on the independent user actions of the managing client device 106a reporting the popular message. For instance, the managing client device 106a may report the popular communication included in a separate digital communication with the dependent client device 110a, (e.g., as sent from the same dependent client device 110k or another dependent client device 110j (not shown)). Of course, the surfacing model 306 could also prioritize surfacing the popular message in the digital communications 312 based on one or more other dependent client devices 110 and/or managing client devices 106 reporting the popular message.

Moreover, the activity dashboard system 104 can similarly monitor the digital complaints 314 via the digital activity data 302a-302b (e.g., as described above in relation to FIG. 2). For example, the digital activity data 302a-302b may include, among other things, reports of inappropriate or offensive behavior by contacts and/or inappropriate or offensive digital media items submitted by the dependent client devices 110. Similarly, the activity dashboard system 104 can detect user interactions from managing client devices 106 via the user interaction data 304a-304b regarding prior-surfaced digital complaints of specific dependent messaging accounts, digital communications, and/or digital media items.

The surfacing model 306 at the act 308 can determine how many instances of the digital complaints 314 to surface to the managing client device 106n. Like with the digital communications 312, in some embodiments, the surfacing model 306 may select a predetermined amount of the digital complaints 314, select an amount within a certain time threshold, select an amount based on the number of complaints, or select an amount based on available space.

In addition to quantity, the surfacing model 306 at the act 308 can determine an order (or priority) of the digital complaints 314 to surface to the managing client device 106n. For example, as similarly described above for the digital communications 312, the surfacing model 306 may determine to surface the digital complaints 314 in accordance with a time-based approach (e.g., reverse chronological order). As another example, the surfacing model 306 may determine to prioritize the digital complaints 314 involving contacts of interest (e.g., best-friends, favorite messaging threads, previously reported contacts, etc. are listed first).

As an additional or alternative example of prioritization of the digital complaints 314, the surfacing model 306 may determine to surface the digital complaints 314 to the managing client device 106n in an order based on a response or sentiment level of a reported/offending act included within a messaging thread. For example, according to an objective heuristics-type of approach, the surfacing model 306 may score a reported/offending act based on associated language used in the reported/offending act. To illustrate, the surfacing model 306 may apply a greater weight of response or sentiment to terms associated with name-calling, shaming, curse words, threats of violence/harm, gender/racial slurs, etc. than other terms associated with less negative (e.g., more neutral or positive) interpretations, connotations, or meanings.

In these or other embodiments, the surfacing model 306 may employ a text analysis algorithm, for example, that models the semantic meaning of terms used in the messaging threads by mapping the terms to vectors in a semantic space where distance reflects meaning. For terms used in a reported messaging thread that are close in semantic space to terms predetermined of greater offensive weight, the surfacing model 306 may score the reported/offending act with a higher offensiveness score. In turn, the surfacing model 306 may choose to prioritize (i.e., assign a greater priority to) a digital complaint associated with a higher offensiveness score. Additionally or alternatively, for terms used in the reported messaging thread that are farther away in semantic space to terms predetermined of greater offensive weight, the surfacing model 306 may score the reported/offending act with a lower offensiveness score and therefore a lower priority.

In yet another example of prioritization of the digital complaints 314, the surfacing model 306 may determine to surface the digital complaints 314 in an order based on a description or reason associated with a digital complaint. For example, using the description or reason associated with a digital complaint, the surfacing model 306 may score or rank a reported/offending act based on a predicted response/sentiment level (e.g., a measure of offense) by a dependent user associated with the dependent client device 110n. In turn, the surfacing model 306 can prioritize those of the digital complaints 314 associated with a higher predicted level of offense taken (e.g., a higher offensiveness ranking) ahead of those of the digital complaints 314 associated with a lower predicted level of offense taken.

In these or other embodiments, the activity dashboard system 104 may utilize a machine-learning model trained to predict a response/sentiment level based on textual input from the description or reason associated with a digital complaint. To train the surfacing model 306 as a machine-learning model (e.g., a classification neural network), the activity dashboard system 104 can compare a predicted response level (e.g., on a scale of 1 to 10) taken with ground truth data (e.g., observed data from dependent client devices) to determine a loss using a loss function. Based on this determined loss, the activity dashboard system 104 can adjust various parameters/hyperparameters to improve the quality/accuracy of a predicted level of response/sentiment in subsequent training iterations.

In some embodiments, the activity dashboard system 104 can apply a prioritization for the digital complaints 314 in an activity dashboard of the managing client device 106n based on others' independent submissions of digital complaints. That is, the surfacing model 306 can determine to surface digital complaints submitted by other managing client devices 106 and/or other dependent client devices 110 at the activity dashboard for the managing client device 106n. For example, as similarly described above in relation to the message "100 ways to tease your siblings," the surfacing model 306 may choose to prioritize surfacing a digital complaint of the popular message sender (e.g., the dependent client device 110k). The managing client device 106n nor the dependent client device 110n may submit a digital complaint regarding the dependent client device 110k. However, because the managing client device 106a previously reported the dependent client device 110k, the activity dashboard system 104 may nonetheless surface a digital complaint of the dependent client device 110k (e.g., in a prioritized manner).

The activity dashboard system 104 can likewise monitor the digital media items 316 via the digital activity data 302a-302b (e.g., as described above in relation to FIG. 2). For example, the digital activity data 302a-302b may include, among other things, digital media items exchanged between the dependent client devices 110. Similarly, the activity dashboard system 104 can detect user interactions from managing client devices 106 via the user interaction data 304a-304b regarding prior-surfaced digital media items exchanged between the dependent client devices 110.

The surfacing model 306 at the act 308 can determine how many instances of the digital media items 316 to surface to the managing client device 106n. Like with the digital communications 312 and the digital complaints 314, in some embodiments, the surfacing model 306 may select a predetermined amount of the digital media items 316, digital media items transmitted within a certain amount of time, or size of the digital media item files (e.g., to preserve resources or loading time). Additionally or alternatively, the surfacing model 306 may select a number of digital media items 316 based on content (e.g., only digital media items that portray a certain class of objects or are a certain type of digital media item).

The surfacing model 306 at the act 308 can determine an order (or priority) of the digital media items 316 to surface to the managing client device 106n. For example, as similarly described above for the digital communications 312 and the digital complaints 314, the surfacing model 306 may determine to surface the digital media items 316 in accordance with a time-based approach (e.g., reverse chronological order). As another example, the surfacing model 306 may determine to prioritize the digital media items 316 involving contacts of interest (e.g., best-friends, favorite messaging threads, previously reported contacts, etc. are listed first).

As an additional or alternative example of prioritization of the digital media items 316, the surfacing model 306 may determine to surface the digital media items 316 to the managing client device 106n in an order that prioritizes reported and/or removed digital media items. To illustrate, the dependent client device 110a or the managing client device 106a may report and/or remove a digital media item sent to the dependent client device 110a from the dependent client device 110n (e.g., as indicated by the digital activity data 302a or the user interaction data 304a). In response, the surfacing model 306 at act 308 may choose to surface the reported digital media item ahead of other digital media items of the digital media items 316 when providing an activity dashboard to the managing client device 106n. In some cases, surfacing the reported digital media item ahead of other digital media items may include re-surfacing the reported digital media item (e.g., adjusting a current position of the reported digital media item within an activity dashboard to a prioritized position ahead of other digital media items).

In some embodiments, the activity dashboard system 104 can prioritize surfacing the digital media items 316 in the activity dashboard of the managing client device 106n based on user interactions and/or digital activity that are independent of the managing client device 106n and the dependent client device 110n. For example, in a same or similar manner as described above in relation to the message "100 ways to tease your siblings," the surfacing model 306 may choose to prioritize surfacing a music video that the dependent client device 110n receives. For instance, the surfacing model 306 may prioritize surfacing the music video in the activity dashboard of the managing client device 106n based on the managing client device 106a reporting the same music video received at the dependent client device 110a (e.g., in a separate digital communication that does not include the dependent client device 110n).

In yet another example of prioritization of the digital media items 316, the surfacing model 306 may determine to surface the digital media items 316 to the managing client device 106n in an order based on learned preferences of the managing client device 106n and/or a plurality of the managing client devices 106. For example, the surfacing model 306 may prioritize those of the digital media items 316 that the surfacing model 306 predicts as corresponding to a greater probability of being reported and/or removed by the managing client device 106n. Thus, in some embodiments, the surfacing model 306 may position the digital media items 316 having the greatest probability of being reported and/or removed in a prioritized position ahead of others.

To determine a probability that a digital media item may be reported and/or removed by the managing client device 106n, the surfacing model 306 may rely on user interaction data 304a-304b (e.g., of many managing client devices for pattern identification and/or machine-learning model training). For example, utilizing historical user interaction data 304a-304b, the surfacing model 306 can identify patterns (e.g., subject matter patterns) in digital media items that the managing client devices 106 report and/or remove from a messaging thread view (or dependent messaging account) of the dependent client devices 110. Additionally or alternatively, the activity dashboard system 104 may employ a machine-learning model (e.g., a convolutional neural network) for the surfacing model 306 that is trained on observed user interaction data 304a-304b to predict reporting/removal of digital media items. For example, the convolutional neural network may be able to identify visual patterns in the digital media items 316 and predict reporting/removal of a digital media item in a manner congruent with past user interaction data 304a-304b.

To train the surfacing model 306 as a convolutional neural network, the activity dashboard system 104 may implement similar training methods described above. For example, the activity dashboard system 104 may compare visual patterns in a digital media item predicted for reporting and/or removal with ground truth data (e.g., visual patterns of actual reported/removed digital media items via observed user interaction data 304b from the managing client device 106n). Based on the comparison, the activity dashboard system 104 may determine a loss. According to the determined loss, the activity dashboard system 104 can then adjust various parameters using a loss function.

In some embodiments, the surfacing model 306 may identify digital activity anomalies 318 for surfacing to managing client devices 106 based on the digital activity data 302a-302b monitored as described above in relation to FIG. 2. For example, the digital activity data 302a-302b may include, among other things, data indicative of changed use, abnormal behavior, spikes in messages sent/received, an excessive amount of video chat calls (or duration of video chat time), a new contact associated with high numbers of instant messages or video chat calls, etc.

To identify the digital activity anomalies 318, in some embodiments, the surfacing model 306 can utilize the digital activity data 302a-302b to determine current and historical measures of digital activity. For example, the surfacing model 306 may determine statistical values (e.g., averages, standard deviations, etc.) based on the digital activity data 302a-302b to determine the current and historical measures of digital activity. In particular, the surfacing model 306 may determine individual measures of digital activity for each of the dependent client devices 110. Additionally or alternatively, the surfacing model 306 may determine group-based measures of digital activity based on contacts, geographic location, age, demographics, social graph data (e.g., as described in relation to FIG. 16), etc.

To identify the digital activity anomalies 318 specific to the dependent client device 110n, in some embodiments, the surfacing model 306 can compare a current measure of digital activity and a historical measure of digital activity specific to the dependent client device 110n. If the current measure of digital activity is within a threshold value of the historical measure of digital activity specific to the dependent client device 110n, the surfacing model 306 may identify no digital activity anomalies 318 to populate in a digital activity anomalies field. Contrary, if the current measure of digital activity is not within a threshold value of the historical measure of digital activity for the dependent client device 110n, the surfacing model 306 may identify the digital activity anomalies 318 as including the portion of digital activity outside the threshold value. To illustrate, the surfacing model 306 may identify a historical average of thirty messages per day (+/− fifteen messages) and a current measure of one hundred instant messages today. Based on the one hundred messages of today exceeding a historical normal maximum of forty-five messages (i.e., thirty messages plus a threshold value of fifteen messages), the surfacing model 306 may identify the digital activity anomalies 318 as corresponding to one or more of the digital communications 312.

In a same or similar manner, the surfacing model 306 may compare a current measure of digital activity specific to the dependent client device 110n with a historical measure of digital activity for a particular subset of dependent client devices 110 (e.g., client devices among a group of contacts, geographic location, age group, demographic population, social graph grouping, etc.). For example, based on such a comparison, the surfacing model 306 can indicate whether a current measure of digital activity for the dependent client device 110n is within normal limits for users of the same age or age group.

In some embodiments, the surfacing model 306 may utilize multiple comparisons (e.g., individual-based comparisons and group-based comparisons) to identify the digital activity anomalies 318. Thus, in some embodiments, the surfacing model 306 may identify a first set of instances of the digital activity anomalies 318 via a first comparison and a second set of instances of the digital activity anomalies 318 via a second comparison. In some cases, some of the identified instances of the digital activity anomalies 318 may overlap from the different comparisons. In other cases, the identified instances of the digital activity anomalies 318 do not overlap. For example, although one hundred instant messages in a day may be within 'normal' limits of the dependent client device 110n (and therefore not constitute as a digital activity anomaly), one hundred instant messages may exceed 'normal' limits for a seven-year old age group. In this example, the surfacing model 306 can therefore still include excessive digital communications as part of the digital activity anomalies 318.

Additionally or alternatively to the foregoing metric-based approaches for identifying the digital activity anomalies 318, the surfacing model 306 may utilize a machine-learning model trained to identify digital activity anomalies via frequency, text-based and/or visual-based analyses. For example, based on frequency of transmission, terms, digital media items, or other features of digital communications or digital complaints, the surfacing model 306 as a machine-learning model may be able to identify such content as indicative of a digital activity anomaly (e.g., generate an anomaly prediction score). As an example, the surfacing model 306 as a machine-learning model may be trained to predict digital activity anomalies based on frequency patterns, terms (e.g., commands), locations provided or requested, etc.

To train the surfacing model 306 as a machine-learning model capable of predicting digital activity anomalies, the activity dashboard system 104 may implement similar training methods described above. For example, the activity dashboard system 104 may compare an instant message predicted as a digital activity anomaly with ground truth data (e.g., observed data). Based on the comparison, the activity dashboard system 104 may determine a loss. According to the determined loss, the activity dashboard system 104 can then adjust various parameters using a loss function.

The surfacing model 306 at the act 308 can determine an order (or priority) of the digital activity anomalies 318 to surface to the managing client device 106n. For example, as similarly described above, the surfacing model 306 may determine to surface the digital activity anomalies 318 in accordance with a time-based approach (e.g., reverse chronological order). As another example, the surfacing model 306 may determine to prioritize the digital activity anomalies 318 involving contacts of interest (e.g., new contacts, best-friends, favorite messaging threads, previously reported contacts, etc. are listed first). Further, in some cases, the surfacing model 306 may determine to prioritize a position of the digital activity anomalies 318 ahead of others of the selectable GUI elements 310 (e.g., to promote additional visibility of the digital activity anomalies 318 within an activity dashboard). For instance, the surfacing model 306 may determine to position the digital activity anomalies 318 in a top (or first) portion of the activity dashboard that is visible without scrolling or other navigational inputs to the managing client device 106n.

Additionally or alternatively to surfacing the detected digital activity anomalies in a separate GUI element (e.g., as indicated in FIG. 3), the surfacing model 306 can modify and/or prioritize surfacing other selectable GUI elements 310 based on a corresponding detected digital activity anomaly. For example, the surfacing model 306 may identify a digital activity anomaly relating to a digital communication. In response, the surfacing model 306 can modify a priority for surfacing the digital communications 312 to prioritize the digital communication associated with the detected digital activity anomaly ahead of other digital communications 312. Additionally or alternatively, the surfacing model 306 may select more of the digital communications 312 to surface (e.g., in relation to the detected digital communication anomaly) and less of the digital media items 316, for instance.

As shown in FIG. 3, in some embodiments, the surfacing model 306 can determine to surface one or more visualizations 320 to the managing client device 106n (e.g., as part of or separate from an activity dashboard). The visualizations 320 may include one or more graphs, charts, tables, or other type of visualization that graphically represents one or more data points for the digital communications 312, the digital complaints 314, the digital media items 316, and/or the digital activity anomalies 318. In some embodiments, the visualizations 320 may correspond to certain time windows and/or data buckets (e.g., adjustable by various filter settings). As an example, the visualizations 320 may include a bar graph representing a week's recap of video chat call time per day, in addition to various statistics (e.g., a daily average, weekly total, etc.).

Further, in some embodiments, the surfacing model 306 can determine to surface one or more custom features 322 to the managing client device 106n (e.g., as part of or separate from an activity dashboard). The custom features 322 may include, for example, remote device logout controls, account visibility controls, supervised friending controls, trusted contact controls, archive surfacing controls, etc. With respect to the remote device logout controls, the surfacing model 306 may determine to surface a selectable option to see a list of all devices on which the managing client device 106n has granted the dependent messaging account access to the dependent client application 112n. In addition, the surfacing model 306 may configure the selectable option adjacent to each client device listing such that, upon selection, the activity dashboard system 104 can 'log out' of the dependent client application 112n on the selected client device. In order for the 'logged out' client device to again have access to the dependent client application 112n, the managing client device 106n may be required to re-authorize the client device (e.g., by re-approving it via the activity dashboard of the present disclosure).

The custom features 322 can also include various settings regarding account visibility for the dependent messaging account (e.g., as part of or separate from an activity dashboard). In particular, the custom features 322 may include options to control (e.g., increase) account visibility such that other contacts (beyond the contacts of the dependent client device 110n) can discover the dependent messaging account associated with the dependent client device 110n. For example, the custom features 322 may include an option to allow friends of friends of the dependent client device 110n and/or of the managing client device 106n to discover the dependent messaging account associated with the dependent client device 110n.

In addition, the custom features 322 can include various options for granting contact adding/removal privileges to the dependent messaging account (e.g., as part of or separate from an activity dashboard). Similarly, the custom features 322 can include options for granting a third-party device (i.e., a trusted-contact client device) contact-control privileges to add/remove contacts from the dependent messaging account. FIGS. 8, 9, 10A-10B, and 11A-11B and the corresponding description explain supervised friending and trusted contacts in more detail.

The custom features 322 can also include options for customizing what content the surfacing model 306 can provide in the activity dashboard. For example, in some embodiments, the custom features 322 may include one or more options to receive additional or alternative content, such as text of instant messages, transcripts of video chat calls, a total volume of communications, etc. Utilizing the custom features 322, the managing client device 106n can thus set up custom fields for receiving desired content.

As shown in FIG. 3, in some embodiments, the activity dashboard system 104 can utilize the surfacing model 306 to surface notifications 324 (e.g., as part of an activity dashboard, an application banner, text/email message, etc.). In particular, the surfacing model 306 may surface one or more of the notifications 324 regarding the selectable GUI elements 310. For example, upon identifying a new digital communication of a video chat call, the surfacing model 306 can surface a notification (e.g., a pop-up window on the managing client device 106n) indicating the dependent client device 110n has begun or completed a new video chat call. Additionally or alternatively, the surfacing model 306 may determine to surface one or more of the notifications 324 in a more selective manner regarding the selectable GUI elements 310 described above. For example, upon identifying a new contact and a subsequent number of communications exceeding a threshold number of digital communications, the surfacing model 306 can determine to send a text alert to the managing client device 106n. The text alert may indicate the heavy communication between the dependent client device 110n and the new contact constitutes a digital activity anomaly. Further, in some embodiments, the notifications 324 may include daily, weekly, and/or monthly summaries of digital activity (as configured according to user settings in the managing client application 108n).

Based on one or more of the selectable GUI elements 310, at the act 326 the surfacing model 306 can provide a GUI (e.g., an activity dashboard, a notification GUI, etc.) to the managing client device 106n via the managing client application 108n. The activity dashboard system 104 can also determine when to surface or update the selectable GUI elements 310. For example, the activity dashboard system 104 can utilize the surfacing model 306 to select one or more of the selectable GUI elements 310 to surface to the managing client device 106n whenever the dependent client device 110 sends or receives a digital communication, sends or receives a digital complaint, sends or receives a digital media item, or detects digital activity anomalies. Alternatively, the surfacing model 306 may select the selectable GUI elements 310 to surface to the managing client device 106n when the digital activity data 302b satisfies a threshold number (e.g., a number of digital communications, complaints, or media items satisfies a threshold number of digital communications, complaints, or media items). Further, in some embodiments, the surfacing model 306 may select selectable GUI elements 310 to surface to the managing client device 106n at regular update intervals (e.g., every five seconds, thirty seconds, minute, ten minutes, hour, four hours, eight hours, twelve hours, twenty-four hours, etc.).

As mentioned above, the activity dashboard system 104 can surface digital communications based on monitored digital activity of a dependent messaging account. FIGS. 4A-4B illustrate the activity dashboard system 104 providing user interfaces 402a-402b on a managing computing device 400 that include an activity dashboard 403 in accordance with one or more embodiments. As shown in FIG. 4A, the activity dashboard system 104 provides, for display within the user interface 402a, the activity dashboard 403 for intuitively reviewing and/or dynamically modifying a dependent messaging account (e.g., associated with a dependent user "Chloe Stevens"). In particular, under an activity tab 404, the activity dashboard system 104 can provide, for display within the user interface 402a, a digital communications field 406a comprising listings of digital communications 407a-407b (collectively, digital communications 407).

As illustrated in FIG. 4A, the activity dashboard system 104 loads, into the digital communications field 406a, the listings of the digital communications 407. For example, consistent with the above description in relation to the previous figures, the activity dashboard system 104 can monitor digital communications sent to and/or from the dependent messaging account (i.e., to a dependent client device). In addition, the activity dashboard system 104 can utilize a surfacing model to select and display the digital communications 407. For instance, in response to the digital communications 407 being the two most recent digital communications, the surfacing model may determine to load the digital communications 407 (as shown) according to a reverse-chronological approach. However, as described above, the surfacing model may determine to surface additional or alternative digital communications than shown in the digital communications field 406a (e.g., based on some contacts warranting a prioritized review).

For each listing of the digital communications 407 surfaced in the activity dashboard 403, the activity dashboard system 104 can provide indicators 408 comprising a count element reflecting a number of digital communications (e.g., for each type of digital communication). For example, based on the monitored digital activity, the activity dashboard system 104 can identify the indicators 408 as including a number of instant messages (e.g., "9 messages") and/or a number of video chat calls (e.g., "3 calls"). In particular, the indicators 408 reflect a number of digital communications between the dependent messaging account and one or more third-party dependent messaging accounts 410 (e.g., "Steve Wilds").

In some embodiments, the activity dashboard system 104 configures each listing of the digital communications 407 as a selectable GUI element. For example, in response to receiving a user interaction at the digital communication 407b with "Francis Bertrand," the activity dashboard system 104 may update the user interface 402a to show additional detail regarding the "2 messages" and "6 calls." Additionally or alternatively, the activity dashboard system 104 may update the user interface 402a to show an account profile of Francis Bertrand. In some embodiments, in response to a user input at the digital communication with "Francis Bertrand," the activity dashboard system 104 provides selectable options to report Francis Bertrand and/or remove Francis Bertrand as a contact of the dependent messaging account for Chloe Stevens.

As additionally shown in FIG. 4A, the user interface 402a comprises selectable options 412-414. In response to user input at the selectable option 412, the activity dashboard system 104 can update the user interface 402a for adding contacts to the dependent messaging account. Additionally, in response to a user input at the selectable option 414, the activity dashboard system 104 can update the user interface 402a to show an expanded view of the digital communications field 406a (e.g., as shown in FIG. 4B).

For instance, as shown in FIG. 4B, the activity dashboard system 104 can provide, for display within a user interface 402b, an expanded digital communications field 406b. In some embodiments, the expanded digital communications field 406b comprises additional listings of the digital communications 407a-407f in the activity dashboard 403. For example, the expanded digital communications field 406b may include all digital communications 407 within a configurable time window (e.g., the past seven days, thirty days, etc.). Additionally or alternatively, the activity dashboard system 104 may provide, for display within the user interface 402b, the listing of digital communications 407 according to determined priorities as described above in relation to FIG. 3.

Figure 5C:
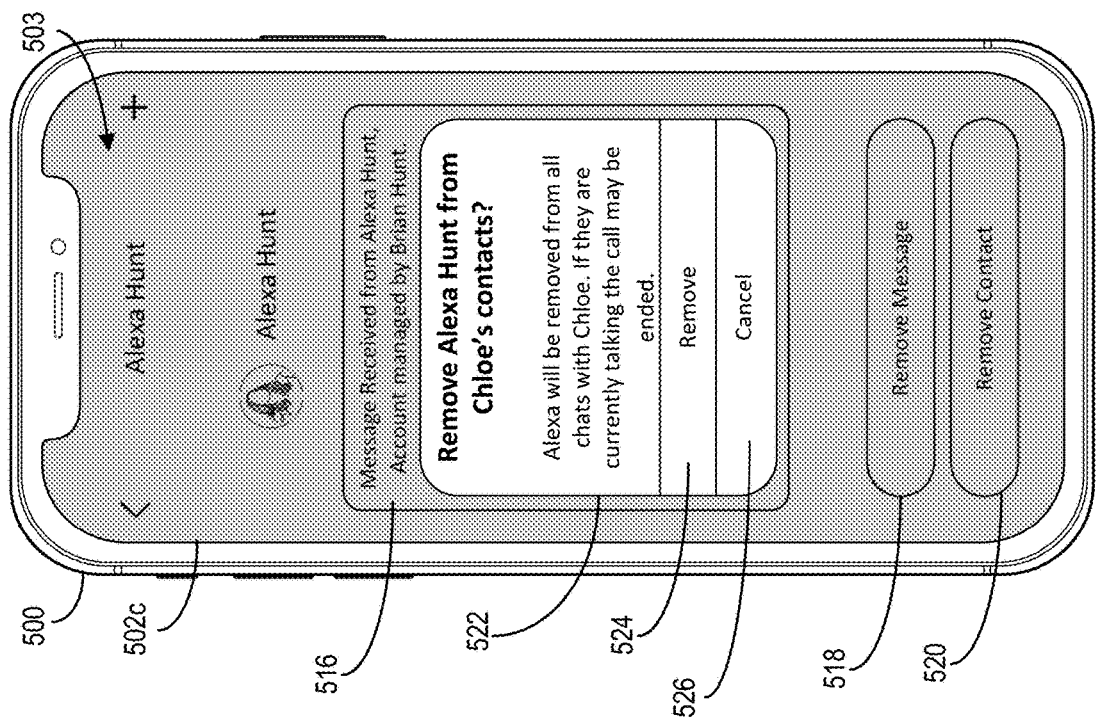

As mentioned above, the activity dashboard system 104 can surface digital complaints based on monitored digital activity of a dependent messaging account. FIGS. 5A-5C illustrate user interfaces 502a-502c on a managing computing device 500 for presenting an activity dashboard 503 in accordance with one or more embodiments. As shown in FIG. 5A, the activity dashboard system 104 provides, for display within the user interface 502a, the activity dashboard 503 for intuitively reviewing and/or dynamically modifying a dependent messaging account (e.g., associated with the dependent user "Chloe Stevens"). In particular, in response to scrolling input under the activity tab 404 of FIG. 4A, the activity dashboard system 104 can provide, for display within the user interface 502a, a digital complaint field 504a comprising listings of digital complaints 505a-505c (collectively, digital complaints 505).

As illustrated in FIG. 5A, the activity dashboard system 104 includes within the digital complaint field 504a indicators of the digital complaints 505. For example, as described above in relation to the foregoing figures, the activity dashboard system 104 can monitor digital complaints to report and/or remove content, digital communications, contacts, or digital media items. In addition, the activity dashboard system 104 can identify user interactions regarding prior digital complaints of specific dependent messaging accounts, digital communications, contacts, and/or digital media items. Based on the monitored digital complaints and/or the identified user interactions, a surfacing model can determine to surface the digital complaints 505. For instance, in response to the digital complaints 505 being the three most recent digital complaints, the surfacing model may determine to load the digital complaints 505 (as shown) according to a reverse-chronological approach. However, as described above, the surfacing model may determine to surface additional or alternative digital complaints than shown in the digital complaint field 504a (e.g., based on some reported messages warranting a prioritized review).

Each listing of the digital complaints 505 comprises various elements. For example, the activity dashboard system 104 can provide indicators reflecting at least one of: a digital communication from other messaging accounts, a digital media item from other messaging accounts, or other messaging accounts (e.g., corresponding to a third-party dependent client device). To illustrate, FIG. 5A shows the indicators of a digital complaint can include an action 506 that the dependent messaging account applied in relation to a third-party dependent messaging account 508. Specifically, the digital complaint 505a shows that a dependent client device for the dependent messaging account ("Chloe") performed the action 506 of blocking the third-party dependent messaging account 508 of "Brock Ford." Of course, the action 506 may include alternative actions, such as reporting, removing, adding, etc. Further, in some embodiments, the action 506 may include updates to previous actions (e.g., unblocking a contact).

As a further example of the various elements of the digital complaints 505, the activity dashboard system 104 can provide indicators that include a comment 510. The comment 510 can include the textual input received from the dependent client device when submitting the digital complaint. In these or other embodiments, the comment 510 can include one or more reasons why the dependent client device applied an action (e.g., the action 506) in relation to a third-party dependent messaging account (e.g., the third-party dependent messaging account 508). For instance, the digital complaint 505b shows that dependent client device for the dependent messaging account ("Chloe") performed an action 506 of reporting a third-party dependent messaging account 508 of "Steve Wilds" because "this person is mean."

As yet another example of the various elements of the digital complaints 505, the activity dashboard system 104 can provide indicators that include a timestamp 512. The timestamp 512 can include a date/time at which the dependent client device associated with the dependent messaging account submitted a digital complaint 505c. Additionally or alternatively, the timestamp 512 can include a duration of time that has lapsed since the dependent client device associated with the dependent messaging account submitted a digital complaint 505c.

As additionally shown in FIG. 5A, the user interface 502a comprises a selectable option 514. In response to user input at the selectable option 514, the activity dashboard system 104 can update the user interface 502a to show an expanded view of the digital complaint field 504a (e.g., as shown in FIG. 5B).

For instance, as shown in FIG. 5B, the activity dashboard system 104 can provide, for display within a user interface 502b, an expanded digital complaint field 504b. In some embodiments, the expanded digital complaint field 504b comprises additional listings of the digital complaints 505a-505f. For example, the expanded digital complaint field 504b may include all digital complaints within a configurable time window (e.g., the past seven days, thirty days, etc.). Additionally or alternatively, the activity dashboard system 104 may provide, for display within the user interface 502b, the listing of digital complaints 505 according to determined priorities as described above in relation to FIG. 3.

In some embodiments, the activity dashboard system 104 configures each listing of the digital complaints 505 as a selectable GUI element. For example, in response to receiving a user interaction at one of the listings of the digital complaints 505 (e.g., at the digital complaint 505c "Chloe reported Alexa Hunt . . . "), the activity dashboard system 104 may update the user interface 502a to show additional detail regarding the comment "this person made me feel weird." Additionally or alternatively, the activity dashboard system 104 may update the user interface 502a to show an account profile of Alexa Hunt and/or selectable options to remove Alexa Hunt as a contact of the dependent messaging account for Chloe Stevens. Additionally or alternatively, the activity dashboard system 104 may update the user interface 502a to show the digital communication(s) received from Alexa Hunt corresponding to the digital complaint 505c (e.g., as shown in FIG. 5C).

As shown in FIG. 5C, the activity dashboard system 104 can respond to a user input at the digital complaint 505c by providing, for display within the user interface 502c, a corresponding digital communication 516, a content removal option 518, and a contact removal option 520. In response to a user input at the content removal option 518, the activity dashboard system 104 can remove the digital communication 516 from a messaging thread view of the dependent client device and dependent messaging account (e.g., as shown in FIGS. 7A-7B).

As shown, the activity dashboard system 104 can respond to a user input at the contact removal option 520 by providing, for display within the user interface 502c, a contact removal notification 522. The contact removal notification 522 comprises a confirmation option 524 and a cancel option 526. In response to a user input at the confirmation option 524, the activity dashboard system 104 can remove Alexa Hunt as a contact of the dependent messaging account. Further, in some embodiments, the activity dashboard system 104 (upon execution of the confirmation option 524) may disconnect any live video chat call between Chloe and Alexa. In some cases, the activity dashboard system 104 may also hide content exchanged between Chloe and Alexa (e.g., as seen from the dependent client device/messaging account and/or the managing account). Alternatively, in response to a user input at the cancel option 526, the activity dashboard system 104 can cause the managing computing device 500 to navigate back to the previous screen including the digital communication 516.

Figure 6C:
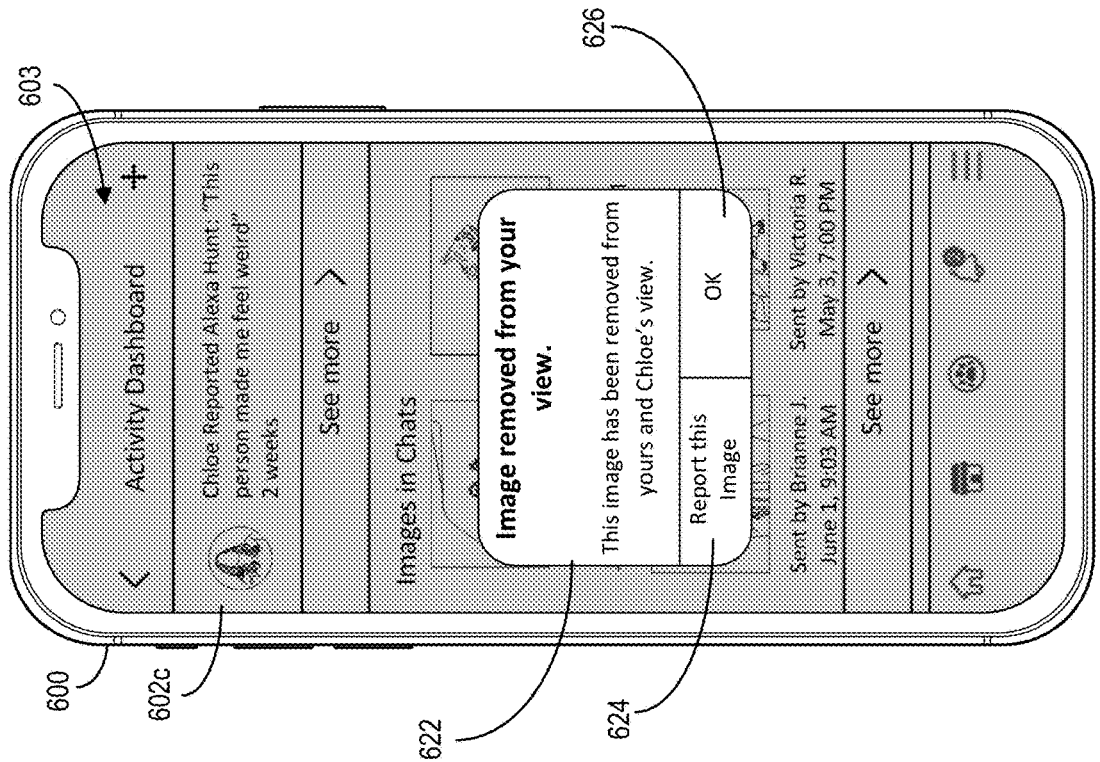

As mentioned above, the activity dashboard system 104 can surface digital media items based on monitored digital activity of a dependent messaging account. FIGS. 6A-6C illustrate user interfaces 602a-602c on a managing computing device 600 for presenting an activity dashboard 603 in accordance with one or more embodiments. As shown in FIG. 6A, the activity dashboard system 104 provides, for display within the user interface 602a, the activity dashboard 603 for intuitively reviewing and/or dynamically modifying a dependent messaging account (e.g., associated with the dependent user "Chloe Stevens"). In particular, responsive to further navigating under the activity tab 404 of FIG. 4A, the activity dashboard system 104 can provide, for display within the user interface 602a, a digital media item field 604 comprising digital media items 606a-606d (collectively, digital media items 606).

As illustrated in FIG. 6A, the activity dashboard system 104 includes the digital media items 606 within the digital media item field 604. For example, as described above in relation to the foregoing figures, the activity dashboard system 104 can monitor digital media items exchanged in instant messages between the dependent messaging account and other messaging accounts (e.g., corresponding to third-party dependent client devices). In addition, the activity dashboard system 104 can identify user interactions regarding prior-surfaced digital media items exchanged between the dependent messaging account and other messaging accounts. Based on the monitored digital media items and/or the identified user interactions, a surfacing model can determine to surface the digital media items 606. For instance, in response to the digital media items 606 being the four most recent digital media items, the surfacing model may determine to load the digital media items 606 (as shown) according to a reverse-chronological approach. However, as described above, the surfacing model may determine to surface additional or alternative digital media items 606 than shown in the digital media item field 604 (e.g., based on some reported digital media items warranting a prioritized review).

Each indicator of the digital media items 606 comprises various elements. For example, the activity dashboard system 104 can provide indicators reflecting at least one of: a sender device, a recipient device, a messaging thread name, or a timestamp corresponding to the digital media item. To illustrate, FIG. 6A shows the indicators of the digital media items 606 can include an action 608, one or more third-party dependent messaging accounts 610, and a timestamp 612. Specifically, the digital media item 606c depicting a dog, for instance, includes the action 608 of receiving the digital media item 606c from the third-party dependent messaging account 610 of "John P." Alternatively, the action 608 may include sending a digital media item 606 (e.g., to multiple third-party dependent messaging accounts 610 associated with "Group Awesome").

With respect to the timestamp 612, the activity dashboard system 104 can provide a date/time at which the dependent client device associated with the dependent messaging account sends or receives a digital media item 606. Additionally or alternatively, the timestamp 612 can include a duration of time that has lapsed since the dependent client device associated with the dependent messaging account sent or received a digital media item 606.

As additionally shown in FIG. 6A, the user interface 602a comprises a selectable option 614. In response to user input at the selectable option 614, the activity dashboard system 104 can update the user interface 602a to show an expanded view of the digital media item field 604 (as similarly shown and described above in relation to FIGS. 4B and 5B).

In some embodiments, the activity dashboard system 104 configures each listing of the digital media items 606 as a selectable GUI element. For example, in response to receiving a user interaction at one of the listings of the digital media items 606 (e.g., at the digital media item 606a "received from Karen K"), the activity dashboard system 104 may update the user interface 602a to show an account profile of Karen K and/or selectable options to remove Karen K as a contact of the dependent messaging account for Chloe Stevens. Additionally or alternatively, the activity dashboard system 104 may update the user interface 602a to show a focused view of the digital media item 606a and/or selectable option(s) to report and/or remove the selected digital media item 606a received from Karen K (e.g., as shown in FIG. 6B).

As shown in FIG. 6B, the activity dashboard system 104 can respond to a user input at a digital media item 606a by providing, for display within the user interface 602b, a modification element 616 comprising a content removal option 618 and a cancel option 620. In response to a user input at the content removal option 618, the activity dashboard system 104 can remove the digital media item 606a from a messaging thread view and/or from the dependent messaging account (e.g., as shown in FIGS. 7A-7B). Alternatively, in response to a user input at the cancel option 620, the activity dashboard system 104 can cause the managing computing device 600 to navigate back to the user interface 602a and/or a focused view of the digital media item 606a. In some embodiments (albeit not illustrated), the modification element 616 can further include a reporting option to report the digital media item 606a (e.g., instead of removing the digital media item 606a).

However, as shown in FIG. 6C, the activity dashboard system 104 can respond to a user input at the content removal option 618 in FIG. 6B by providing, for display within the user interface 602c, a content removal notification 622 confirming the digital media item has been removed. The content removal notification 622 further comprises a reporting option 624 and a confirmation option 626. In response to a user input at the reporting option 624, the activity dashboard system 104 can report the digital media item 606a. By reporting the digital media item 606a, the activity dashboard system 104 can flag the digital media item 606a for system review and/or a prioritized review of the managing client device for Karen K as described above in relation to FIG. 3. Alternatively, in response to a user input at the confirmation option 626, the activity dashboard system 104 can cause the managing computing device 600 to navigate back to the user interface 602a updated without the digital media item 606a.

As mentioned above, the activity dashboard system 104 can remove digital media items from a messaging thread view and/or from a dependent messaging account in response to user input in an activity dashboard of a managing client device. FIGS. 7A-7B illustrate user interfaces 702a-702b on a dependent computing device 700 for presenting a messaging thread 704 in accordance with one or more embodiments. As shown in FIG. 7A, the activity dashboard system 104 provides, for display within the user interface 702a, the messaging thread 704 comprising a digital media item 706. In particular, responsive to receiving digital communications from a messaging account associated with Karen K, the activity dashboard system 104 can surface the digital communications comprising the digital media item 706 and the text messages of "look at this!" and "cool huh?".

In addition to surfacing the digital media item 706 in the user interface 702, the activity dashboard system 104 can also surface the digital media item 706 in an activity dashboard of a managing client device. For example, in response to the activity dashboard system 104 monitoring the sending and receiving of digital media items, the activity dashboard system 104 can surface the digital media item 706 in accordance with a variety of factors as weighed by a surfacing model. After surfacing the digital media item 706 to the activity dashboard of the managing client device, the activity dashboard system 104 can receive user interaction data from the managing client device requesting removal of the digital media item 706 (e.g., as shown and described above in relation to the foregoing figures, including FIGS. 6A-6C).

In response to the user interaction at the managing client device, the activity dashboard system 104 can remove the digital media item 706 in the messaging thread 704 as viewed by the dependent messaging account. For example, as shown in FIG. 7B, the activity dashboard system 104 can provide, for display within the user interface 702b, a removal notice 708 indicating to the dependent user that the managing client device has removed the digital media item 706 received from Karen K in the messaging thread 704. As the removal notice 708 indicates, the third-party dependent messaging account (e.g., associated with Karen K) in the messaging thread 704 will still be able to view the digital media item 706.

In some embodiments, the removal notice 708 is a selectable GUI element. For example, in some implementations, the activity dashboard system 104 can open up a new messaging thread (or continue a messaging thread) with the managing client device in response to detecting a user input at the removal notice 708. In this manner, the activity dashboard system 104 can allow the dependent computing device 700 to dynamically initiate a follow-up conversation with the managing client device regarding the removal of the digital media item 706.

Figure 8:
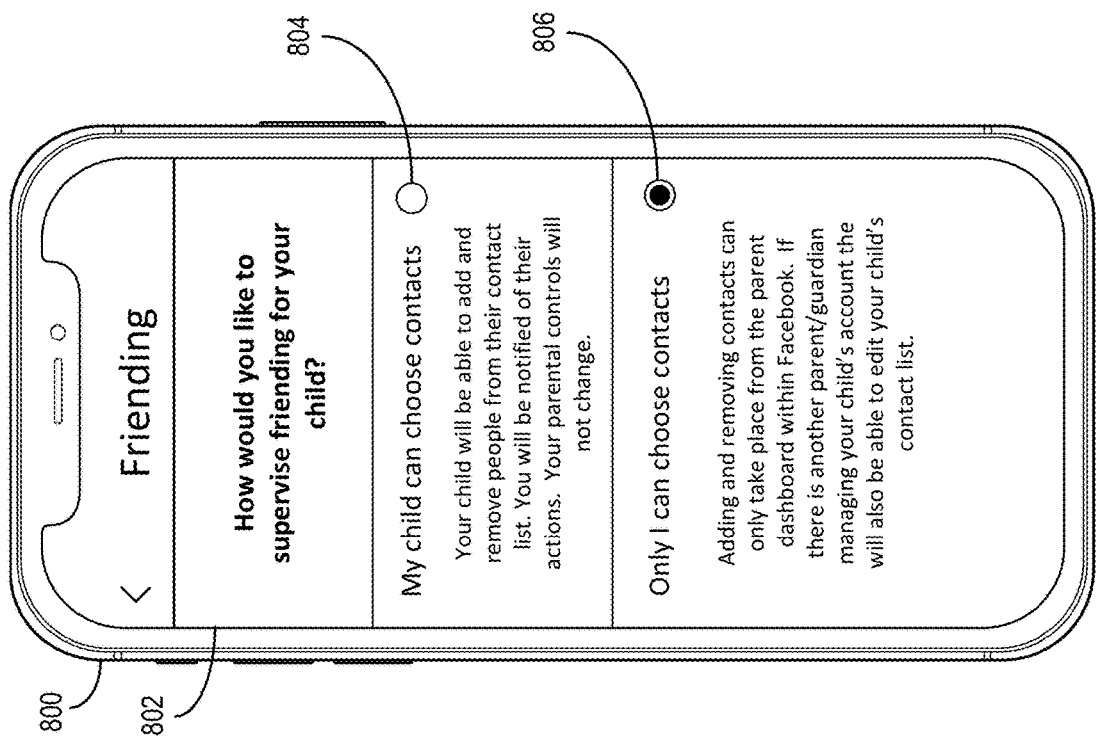
FIG. 8 illustrates a user interface on a managing computing device for adjusting contact-control privileges in accordance with one or more embodiments.

As mentioned above, the activity dashboard system 104 may surface supervised friending controls relating to the ability to grant contact adding/removal privileges to the dependent messaging account (e.g., as part of or separate from an activity dashboard). FIG. 8 illustrates a user interface 802 on a computing device 800 (e.g., a managing client device) for adjusting contact-control privileges in accordance with one or more embodiments.

As shown in FIG. 8, the activity dashboard system 104 provides, for display within the user interface 802, selectable options 802-804 for providing and removing contact-control privileges to a dependent client device. In response to receiving an indication of a user input at the selectable option 804, the activity dashboard system 104 can provide contact-control privileges to the dependent client device. With the provided contact-control privileges, the dependent client device can add and remove contacts from the dependent messaging account like the managing client device. In response to such changes to contacts, the activity dashboard system 104 can (as described above in relation to the foregoing figures) monitor and surface such changes in the activity dashboard. For example, as part of or separate from the digital complaint field described above, the activity dashboard system 104 can surface contact changes to the "updates to contacts" section of the activity dashboard (e.g., as shown in FIGS. 5A-5B). Additionally or alternatively, the activity dashboard system 104 may transmit a notification to the computing device 800 each time the dependent client device makes, approves, or rejects a contact request.

Alternatively, in response to receiving an indication of a user input at the selectable option 806, the activity dashboard system 104 can revoke contact-control privileges from a dependent client device. Instead, the activity dashboard system 104 can maintain contact-control privileges with the managing client account(s), among modification privileges as described above in relation to the foregoing figures.

As mentioned above, based on authorization from a managing client device, the activity dashboard system 104 can also share contact-control privileges with a trusted contact client device. With contact-control privileges granted to the trusted contact client device, the managing client device authorizes the trusted contact client device to add and/or remove contacts from a dependent messaging account managed by the managing client device. Moreover, with contact-control privileges, a group-organizer can add and/or remove contacts from a networking group. Thus, according to the authorized sharing of contact-control privileges, the activity dashboard system 104 can add, for example, a teacher or coach as a trusted contact for the dependent messaging account. As a trusted contact, the teacher or coach can subsequently connect (in a safe, efficient, and secure manner) the dependent messaging account to other third-party dependent messaging accounts in a networking group designated for a class, team, etc.

Figure 9:
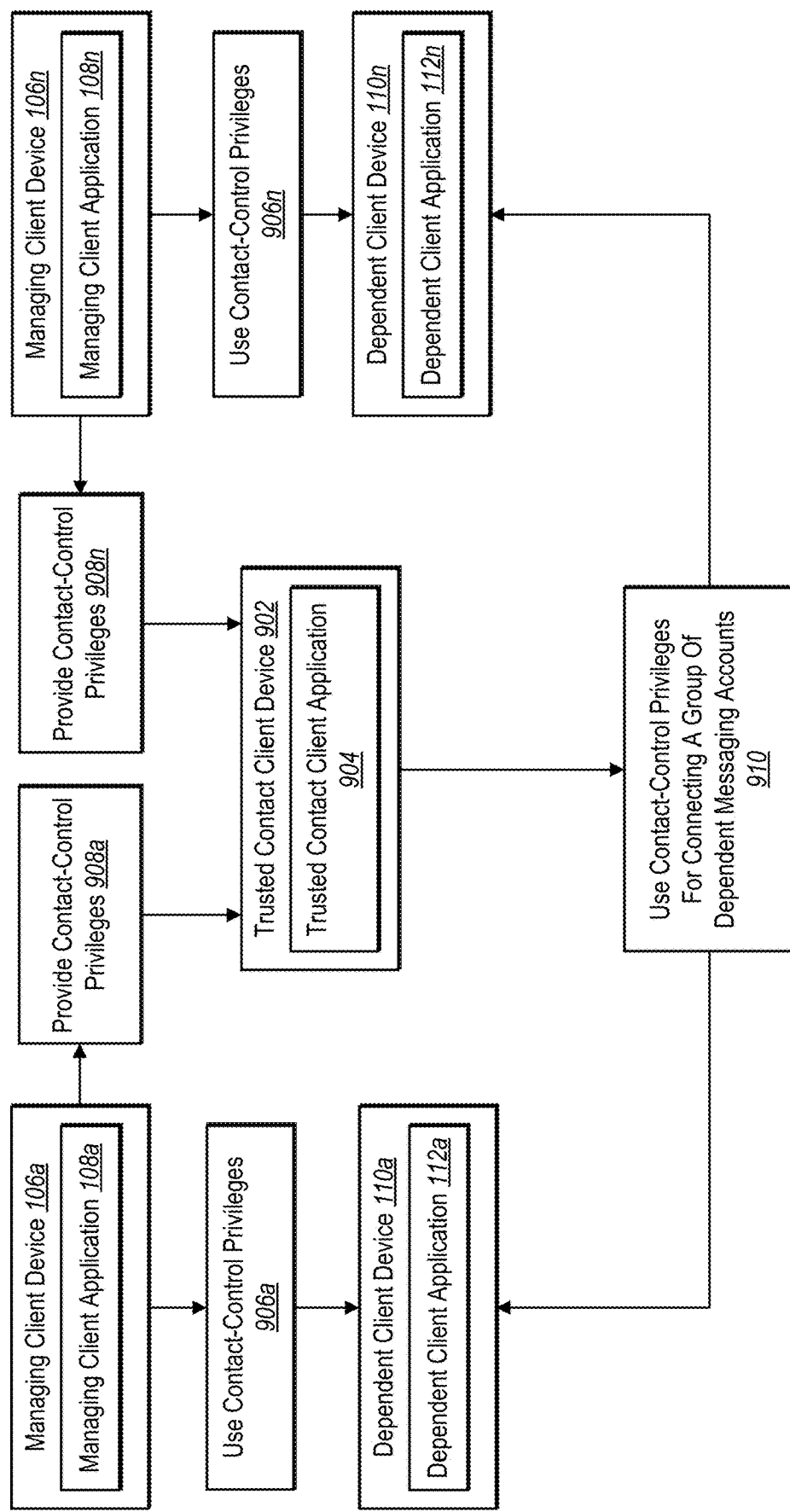
FIG. 9 illustrates managing client devices providing contact-control privileges to a trusted contact client device in accordance with one or more embodiments.

For example, FIG. 9 illustrates a trusted contact client device 902 receiving a plurality of contact-control privileges for connecting a group of dependent messaging accounts in accordance with one or more embodiments. Albeit not illustrated, the activity dashboard system 104 can perform the acts described below (e.g., as described in relation to a managing client device and/or a trusted contact client device).

As shown in FIG. 9, the managing client devices 106 at acts 906a, 906b can respectively use contact-control privileges to add and/or remove contacts (e.g., as described in relation to the foregoing figures). For example, via an activity dashboard corresponding to the managing client device 106a, the managing client device 106a can add and/or remove contacts from a dependent messaging account associated with the dependent client device 110a. For instance, in review of a digital media item surfaced in the activity dashboard for the managing client device 106a, the managing client device 106a may opt to remove the sender account as a contact of the dependent messaging account associated with the dependent client device 110a. Likewise, the managing client device 106n can add and/or remove contacts from a dependent messaging account associated with the dependent client device 110n via an activity dashboard corresponding to the managing client device 106n.

As further shown in FIG. 9, the managing client devices 106 at acts 908a, 908n can respectively provide contact-control privileges to the trusted contact client device 902. In some embodiments, the acts 908a, 908n can include the trusted contact client device 902 requesting that one or more of the managing client devices 106 provide the respective contact-control privileges (e.g., via a trusted contact client application 904). For example, the trusted contact client device 902 may create a networking group (e.g., the "Dragon Math Group") designated for a $6^{th}$ grade math class taught by a user of the trusted contact client device 902. After creating the networking group, the trusted contact client device 902 may send a link requesting that the managing client devices over the dependent messaging accounts of students in the $6^{th}$ grade math class (e.g., the managing client devices 106) provide contact-control privileges.

Additionally or alternatively, the acts 908a, 908n in some embodiments can include one or more of the managing client devices 106 requesting that the trusted contact client device 902 accept contact-control privileges for a corresponding dependent messaging account. To illustrate with an example scenario, a parent may wish to integrate their child as a new student into the $6^{th}$ grade math class mentioned above. In this example, a managing client device (e.g., the managing client device 106n) may submit, to the trusted contact client device 902, a request for a corresponding dependent messaging account to join the Dragon Math Group. As part of the request to join the Dragon Math Group, the managing client device 106n can grant authorization to the trusted contact client device 902 for connecting the dependent client device 110n to the Dragon Math Group.

Based on the trusted contact client device 902 receiving the provided contact-control privileges from the managing client devices 106, the trusted contact client device 902 can subsequently, at an act 910, use the contact-control privileges for connecting a group of dependent messaging accounts. That is, at the act 910, the trusted contact client device 902 can add the dependent client device 110a and the dependent client device 110n to a networking group (e.g., the Dragon Math Group). In doing so, the activity dashboard system 104 can add the dependent messaging accounts for the dependent client device 110a and the dependent client device 110n as contacts of the trusted contact account. Further, the activity dashboard system 104 can connect, as contacts, each dependent messaging account to each of the other dependent messaging accounts in the networking group (e.g., all members of the Dragon Math Group become contacts).

After connecting a dependent messaging account to the networking group and to each dependent messaging account in the networking group, each of the dependent client devices 110 and/or the trusted contact client device 902 can communicate with the networking group as a whole. Similarly, each of the dependent client devices 110 and/or the trusted contact client device 902 can communicate with one or more individual members of the networking group. Accordingly, by delegating contact-control privileges to the trusted contact account, the activity dashboard system 104 can indeed reduce the user interactions, time, and processing resources for connecting and managing a group of dependent messaging accounts, such as the Dragon Math Group.

Additionally, in some embodiments, the trusted contact client device 902 may be able to form multiple groups of the dependent messaging accounts entrusted to the trusted contact client device 902. For example, the trusted contact client device 902 may form sub-groups of the original networking group (e.g., sub-groups of the Dragon Math Group). Alternatively, in another example, the trusted contact client device 902 may form a separate networking group of two or more dependent messaging accounts based on the provided contact-control privileges (e.g., a "Chess Club Group" comprising two or more members from the Dragon Math Group). In these or other embodiments, however, changes made to the dependent messaging accounts by the trusted contact client device 902 are subject to review and modification by the managing client devices 106. For example, the managing client devices 106 can remove any contact that the trusted contact client device 902 adds to the dependent messaging accounts.

In some embodiments, the trusted contact client device 902 may have limited use of contact-control privileges at the act 910. For example, in some embodiments, the trusted contact client device 902 may only add to the networking group the dependent messaging accounts that are authorized by corresponding managing client accounts. Accordingly, the trusted contact client device 902 may not be able to unilaterally add a dependent messaging account to the Dragon Math Group unless authorized by a managing client device.

As another example of limitations on contact-control privileges, the trusted contact client device 902 may have a limited authorization period in which to execute contact-control privileges. For instance, as a security feature, the managing client devices 106 may provide to the trusted contact client device 902 contact-control privileges that are time-bound and therefore expire after a predetermined amount of time lapses (e.g., after one month). In some cases, the managing client devices 106 may specify and/or modify the expiration time. In other cases, the activity dashboard system 104 may default to a preset expiration time. In either case, when the authorization period expires, the activity dashboard system 104 may revoke trusted contact status from the trusted contact client device 902 (e.g., strip the trusted contact client device 902 of the provided contact-control privileges).

Other events may also trigger the trusted contact client device 902 to lose a trusted contact status (e.g., as additional or alternative digital security features). For example, in response to the managing client device 106a removing the dependent client device 110a from the networking group, the activity dashboard system 104 can dissolve the networking group and remove the trusted contact client device 902 as a trusted contact for all corresponding dependent messaging accounts. Alternatively, any of the managing client devices 106 can remove the trusted contact client device 902 as a trusted contact or downgrade the trusted contact client device 902 to a regular contact. In response to these types of changes for any of the dependent messaging accounts in the networking group, the activity dashboard system 104 can likewise remove the trusted contact client device 902 as a trusted contact for all dependent messaging accounts and dissolve the networking group.

Figure 10B:
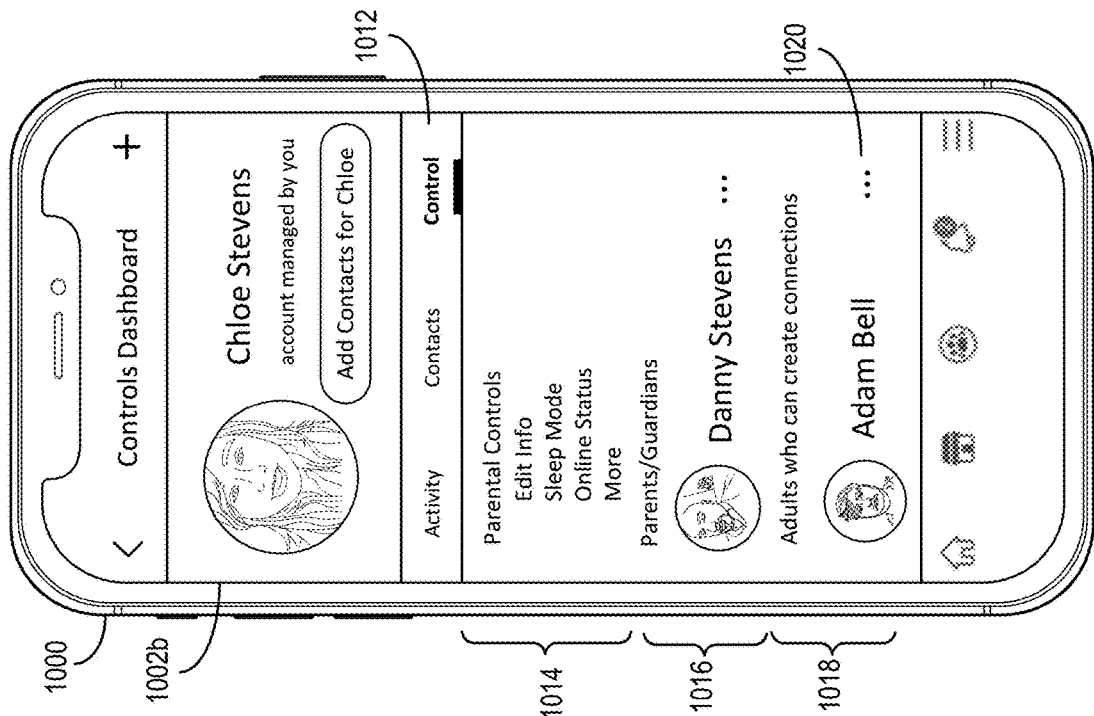
FIGS. 10A-10B illustrate user interfaces on a computing device for granting contact-control privileges to a trusted contact account in accordance with one or more embodiments.
Figure 10A:
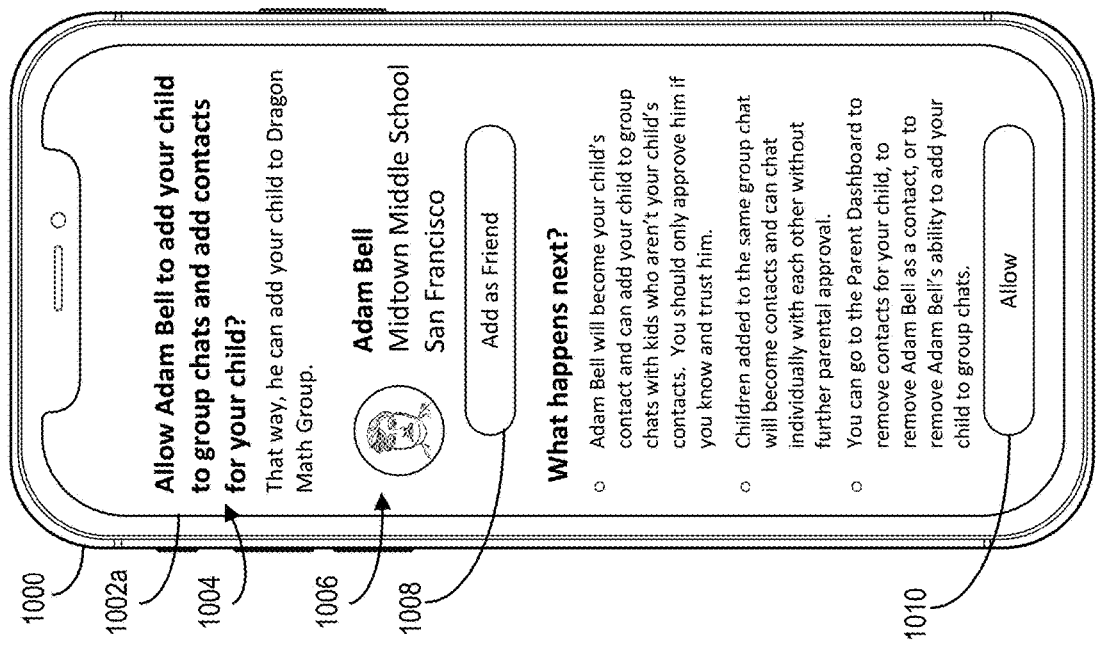

As mentioned above, the activity dashboard system 104 can provide contact-control privileges from a managing client device to a trusted contact account to reduce user interactions, time, and processing resources required to manage contacts across dependent messaging accounts. FIGS. 10A-10B illustrate user interfaces 1002a-1002b on a computing device 1000 for granting contact-control privileges to a trusted contact account in accordance with one or more embodiments. As shown in FIG. 10A, the activity dashboard system 104 provides, for display within the user interface 1002a, a trusted contact request 1004 comprising a trusted contact account 1006, an add-contact option 1008, and a confirmation option 1010.

In particular, FIG. 10A shows the activity dashboard system 104 providing, for display within the user interface 1002a, the trusted contact request 1004 in response to a trusted contact client device associated with "Adam Bell" requesting contact-control privileges from managing client devices. Via the trusted contact request 1004, the computing device 1000 can authorize the requested contact-control privileges. Specifically, in response to executing the confirmation option 1010, the computing device 1000 (as a managing client device) can grant the trusted contact account 1006 the ability to add a corresponding dependent messaging account to a networking group (e.g., the Dragon Math Group). In addition, by executing the confirmation option 1010, the computing device 1000 can grant the trusted contact account 1006 the ability to add the members of the networking group as contacts to the corresponding dependent messaging account. Further, by executing the confirmation option 1010, the computing device 1000 can designate (or add) the trusted contact account 1006 as a trusted contact of the corresponding dependent messaging account.

In some embodiments, the trusted contact request 1004 can allow for additional review of and/or interaction with the trusted contact account 1006. For example, in some embodiments, the trusted contact account 1006 may be a selectable GUI element that, in response to a user interaction, causes the activity dashboard system 104 to update the user interface 1002a to show an account profile of the trusted contact account 1006. Additionally or alternatively, the computing device 1000 can request to add the trusted contact account 1006 as a contact to the managing client account to learn additional information and/or follow the trusted contact account 1006. Accordingly, in response to detecting a user interaction with the add-contact option 1008, the activity dashboard system 104 can add the trusted contact account 1006 as a contact to the managing client account.

After granting contact-control privileges to the trusted contact account 1006 (e.g., based on selection of the confirmation option 1010), the activity dashboard system 104 can surface the trusted contact account 1006, for example, in a controls dashboard of the user interface 1002b as shown in FIG. 10B. In particular, FIG. 10B shows the activity dashboard system 104 surfacing, under a controls tab 1012, various parental controls 1014, a parent/guardian section 1016, and a trusted contacts field 1018 comprising the newly added trusted contact account of "Adam Bell."

Under the controls tab 1012, the computing device 1000 can receive various user inputs to modify the dependent messaging account. For example, via the parental controls 1014, the activity dashboard system 104 can modify a dependent messaging account based on user interaction with one or more of: dependent messaging account information, a sleep mode, online status visibility, etc. Similarly, via the parent/guardian section 1016, the activity dashboard system 104 modify (e.g., add, remove, edit) managing client accounts that manage the dependent messaging account.

With respect to the trusted contacts field 1018, the activity dashboard system 104 can further allow the computing device 1000 to modify the dependent messaging account in relation to trusted contacts. For example, in response to a user interaction with a selectable option tab 1020, the activity dashboard system 104 can update the user interface 1002b to surface various options for modifying the trusted contacts of the dependent messaging account. To illustrate, the computing device 1000 may select one or more options to add/modify/remove contact-control privileges (e.g., change an expiration date), remove the trusted contact account as a trusted contact, message the trusted contact account, etc.

Figure 11B:
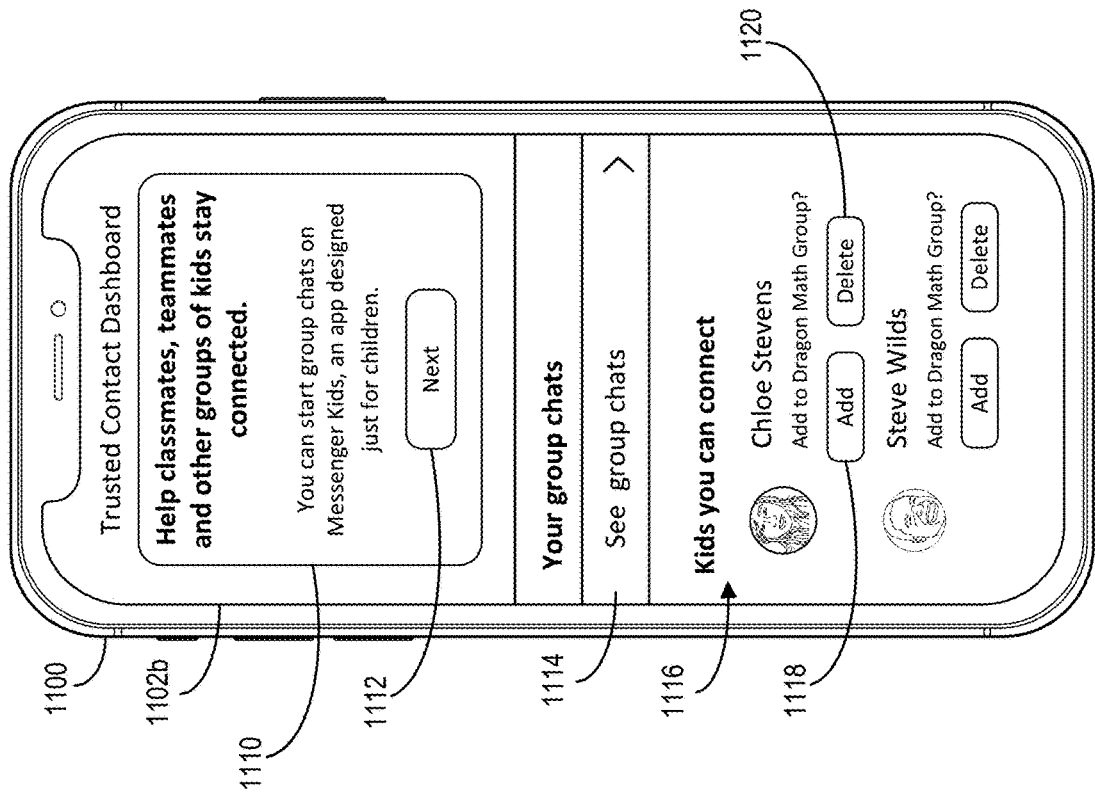
FIGS. 11A-11B illustrate user interfaces on a computing device for adding a dependent messaging account to a networking group in accordance with one or more embodiments.
Figure 11A:
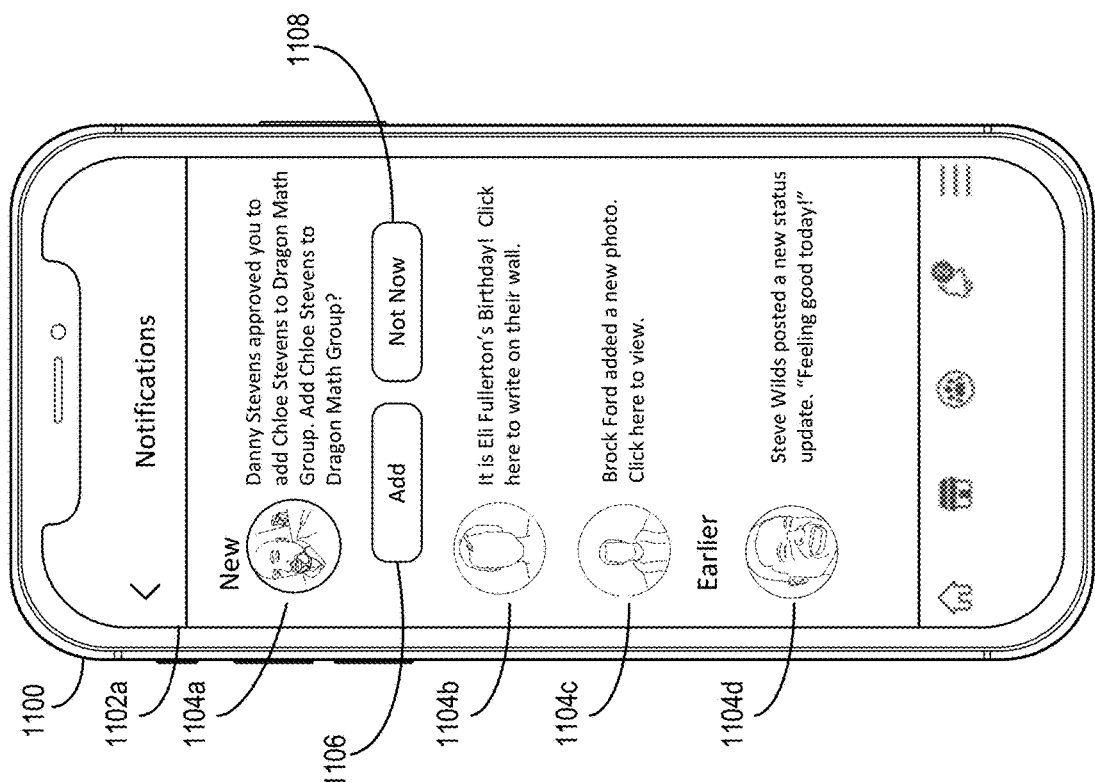

As mentioned above, the activity dashboard system 104 can provide contact-control privileges from a managing client device to a trusted contact account for connecting a group of dependent messaging accounts in an efficient and secure manner. FIGS. 11A-11B illustrate user interfaces 1102a-1102b on a computing device 1100 for adding a dependent account to a networking group in accordance with one or more embodiments. As shown in FIG. 11A, the activity dashboard system 104 provides, for display within the user interface 1102a, notifications 1104a-1104d (e.g., including some in relation to a social network). In particular, FIG. 11A shows the activity dashboard system 104 providing, for display within the user interface 1102a, the notification 1104a in response to receiving contact-control privileges from a managing client device (e.g., as just shown and described in relation to FIGS. 10A-10B).

Specifically, FIG. 11A shows the activity dashboard system 104 surfacing the notification 1104a in response to a managing client device associated with "Danny Stevens"

providing contact-control privileges to the computing device 1100 (e.g., to use in connecting dependent messaging accounts in the Dragon Math Group). As part of the notification 1104*a*, the activity dashboard system 104 also surfaces selectable options 1106-1108. In response to a user interaction with the selectable option 1106, the activity dashboard system 104 can add the dependent messaging account for Chloe Stevens to the Dragon Math Group. Thus, in a user-friendly way, the activity dashboard system 104 allows the computing device 1100 as a trusted contact client device to utilize the provided contact-control privileges without requiring further user interaction beyond the notifications 1104*a*-1104*d* in the user interface 1102*a*. Alternatively, in response to a user interaction with the selectable option 1108, the activity dashboard system 104 can decline to add the dependent messaging account for Chloe Stevens to the Dragon Math Group.

Additionally or alternatively to a notifications-type approach, the activity dashboard system 104 can surface selectable options for adding the dependent messaging account to the networking group via a trusted contact dashboard. For example, as shown in FIG. 11B, the activity dashboard system 104 can provide, for display within the user interface 1102*b*, a trusted contact dashboard comprising a group creation message 1110, a group chat tab 1114, and a pending contact section 1116 with selectable options 1118-1120.

As shown in FIG. 11B, the group creation message 1110 comprises a group creation element 1112 that, in response to a user interaction, causes the activity dashboard system 104 to update the user interface 1102*b* to show a group creation interface. Via the group creation interface, the activity dashboard system 104 allows the computing device 1100 to form a networking group (e.g., the Dragon Math Group) and request contact-control privileges from managing client devices.

With respect to the group chat tab 1114, the activity dashboard system 104 can, in response to user input, update the user interface 1102*b* to show the networking groups created by and entrusted to the trusted contact account. In some embodiments, the group chat tab 1114 can show all active networking groups (e.g., the Dragon Math Group), while in other embodiments, all active and in-active (e.g., previous, expired, dissolved) networking groups created by the trusted contact account.

As further shown in FIG. 11B, the activity dashboard system 104 surfaces in the pending contact section 1116 each of the dependent messaging accounts for which corresponding managing client devices have provided contact-control privileges. Accordingly, the activity dashboard system 104 surfaces the dependent messaging account for Chloe Stevens in the pending contact section 1116 in response to the managing client device associated with Danny Stevens providing contact-control privileges to the computing device 1100 (e.g., for managing the Dragon Math Group).

In these or other embodiments, the pending contact section 1116 includes dependent messaging accounts for which corresponding managing client devices have provided contact-control privileges generally. That is, in some embodiments, the computing device 1100 (as a trusted contact client device) can connect dependent messaging accounts without forming a networking group. For example, in some implementations, the activity dashboard system 104 can allow the computing device 1100 to connect Chloe Stevens to Steve Wilds without the Dragon Math Group. Upon connecting Chloe Steven and Steve Wilds, the activity dashboard system 104 can send a notification to the managing client devices for Chloe Stevens and Steve Wilds (and/or update respective activity dashboards) indicating the new connection.

Via the selectable option 1118, the activity dashboard system 104 can add the dependent messaging account for Chloe Stevens to the Dragon Math Group. Alternatively, in response to a user interaction with the selectable option 1120, the activity dashboard system 104 can delete the request and decline to add the dependent messaging account for Chloe Stevens to the Dragon Math Group. In these or other embodiments, the selectable options 1118-1120 can also provide additional security for the dependent messaging account. For example, by requiring the computing device 1100 to complete the addition of the dependent messaging account to the networking group (e.g., as approved by the managing client device), the computing device 1100 can ensure the dependent messaging account is added to the intended networking group.

Figure 12:
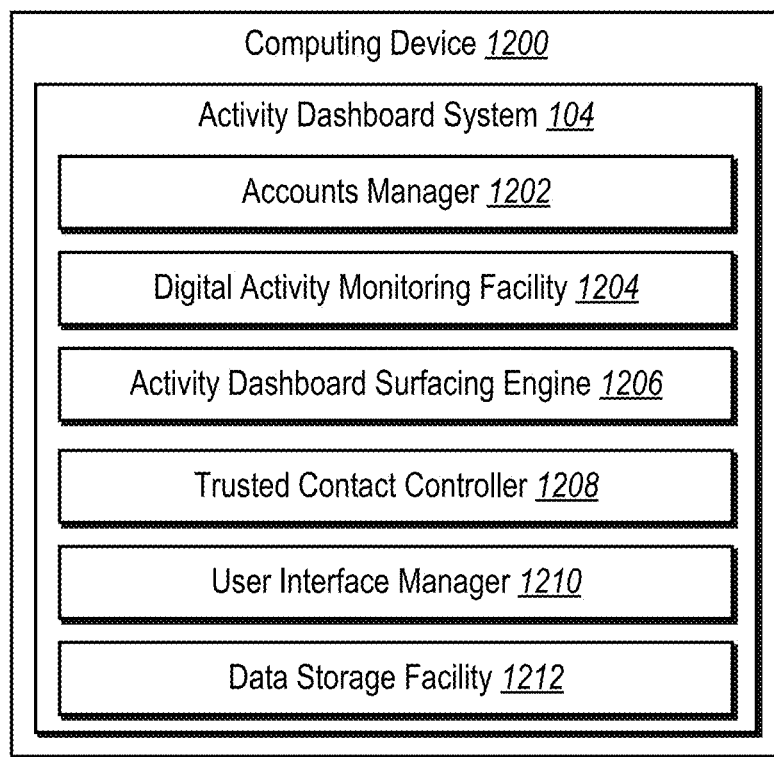
FIG. 12 illustrates an example schematic diagram of an activity dashboard system in accordance with one or more embodiments.

Turning to FIG. 12, additional detail will now be provided regarding various components and capabilities of the activity dashboard system 104. In particular, FIG. 12 illustrates an example schematic diagram of a computing device 1200 (e.g., the server(s) 102, the managing client devices 106, the dependent client devices 110, the managing computing devices 400-600, 800, the dependent computing device 700, the trusted contact client devices 116, 902, and/or the computing devices 1000-1100) implementing the activity dashboard system 104 in accordance with one or more embodiments. As shown, the activity dashboard system 104 is further implemented by the server(s) 102. Also illustrated, the activity dashboard system 104 can include an accounts manager 1202, a digital activity monitoring facility 1204, an activity dashboard surfacing engine 1206, a trusted contact controller 1208, a user interface manager 1210, and a data storage facility 1212.

The accounts manager 1202 can generate, store, authorize access, and/or link accounts associated with a networking system (e.g., a digital communication system and/or a social networking system). In particular, the accounts manager 1202 can generate a dependent messaging account associated with a dependent client device. Further, the accounts manager 1202 can link the dependent messaging account linked to a managing account corresponding to a managing client device. Additionally, the accounts manager 1202 can perform various actions (e.g., modifications) to accounts. For example, in relation to a dependent messaging account, the accounts manager 1202 can add or remove contacts, remove digital media items from a messaging thread view, and/or report digital communications, contacts, and/or digital media items via an activity dashboard (as described in relation to the foregoing figures).

The digital activity monitoring facility 1204 can monitor digital activity of a dependent messaging account (as described in relation to the foregoing figures). In particular, the digital activity monitoring facility 1204 can track digital communications between messaging accounts (e.g., a dependent client device and third-party client devices). In addition, the digital activity monitoring facility 1204 can track digital complaints by tracking reporting occurrences of contacts and/or digital media items that a dependent client device reports. Further, the digital activity monitoring facility 1204 can track digital media items exchanged in digital communications between a dependent messaging account and other messaging accounts.

The activity dashboard surfacing engine 1206 can utilize a surfacing model to intelligently determine what digital activity to surface in an activity dashboard (as described in relation to the foregoing figures). In particular, the activity dashboard surfacing engine 1206 can utilize the monitored digital activity of a dependent messaging account from the digital activity monitoring facility 1204 and user interactions of managing client devices from the user interface manager 1210 to determine what, when, how much, and/or in what order to surface digital activity in the activity dashboard. For example, the activity dashboard surfacing engine 1206 can implement the surfacing model as a heuristic model and/or one or more trained machine-learning models to select and prioritize certain digital activity ahead of other digital activity in an activity dashboard. In addition the activity dashboard surfacing engine 1206 can identify digital activity anomalies, generate visualizations, and surface various custom features (e.g., remote device logout controls, account visibility controls, supervised friending controls, trusted contact controls, archive surfacing controls, etc.).

The trusted contact controller 1208 can apply, transmit, request, generate, and/or receive computer-executable instructions for modifying and/or maintaining contact-control privileges (as described in relation to the foregoing figures). In particular, the trusted contact controller 1208 can process user interaction data from a managing client device associated with a managing account to authorize a trusted contact account to be able to add/remove contacts to a dependent messaging account associated with a dependent client device. Additionally or alternatively, the trusted contact controller 1208 can process user interaction data from a trusted contact client device requesting authorization from the managing client device to add/remove contacts to the dependent messaging account. Once the trusted contact client device is authorized, the trusted contact controller 1208 can further communicate with the accounts manager 1202 to add/remove contacts for connected dependent client devices (e.g., that are in a common social networking system group).

The user interface manager 1210 can provide, manage, and/or control a graphical user interface (or simply "user interface"). In particular, the user interface manager 1210 may generate and display a user interface (e.g., an activity dashboard as described in relation to the foregoing figures) by way of a display screen composed of a plurality of graphical components, objects, and/or elements that allow a user to perform a function. For example, the user interface manager 1210 can receive indications of user interactions at an activity dashboard, such as a click/tap to report a contact or remove a digital media item from messaging thread view and/or from a dependent messaging account. Additionally, the user interface manager 1210 can present a variety of types of information regarding a dependent messaging account, including text, digital media items, etc. The user interface manager 1210 can additionally present such information in a host of different formats (e.g., as part of an activity dashboard, an application banner, text/email message, etc.).

The data storage facility 1212 maintains data for the activity dashboard system 104. The data storage facility 1212 (e.g., via one or more memory devices) can maintain data of any type, size, or kind, as necessary to perform the functions of the activity dashboard system 104. For example, the data storage facility 1212 may store digital media items, instant messages, etc. that the digital activity monitoring facility 1204 monitors and/or the activity dashboard surfacing engine 1206 determines to surface to managing client devices.

Each of the components of the computing device 1200 can include software, hardware, or both. For example, the components of the computing device 1200 can include one or more instructions stored on a computer-readable storage medium and executable by processors of one or more computing devices, such as a client device or server device. When executed by the one or more processors, the computer-executable instructions of the activity dashboard system 104 can cause the computing device(s) (e.g., the computing device 1200) to perform the methods described herein. Alternatively, the components of the computing device 1200 can include hardware, such as a special-purpose processing device to perform a certain function or group of functions. Alternatively, the components of the computing device 1200 can include a combination of computer-executable instructions and hardware.

Furthermore, the components of the computing device 1200 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 1200 may be implemented as a stand-alone application, such as a desktop or mobile application. Furthermore, the components of the computing device 1200 may be implemented as one or more web-based applications hosted on a remote server.

Figure 13:
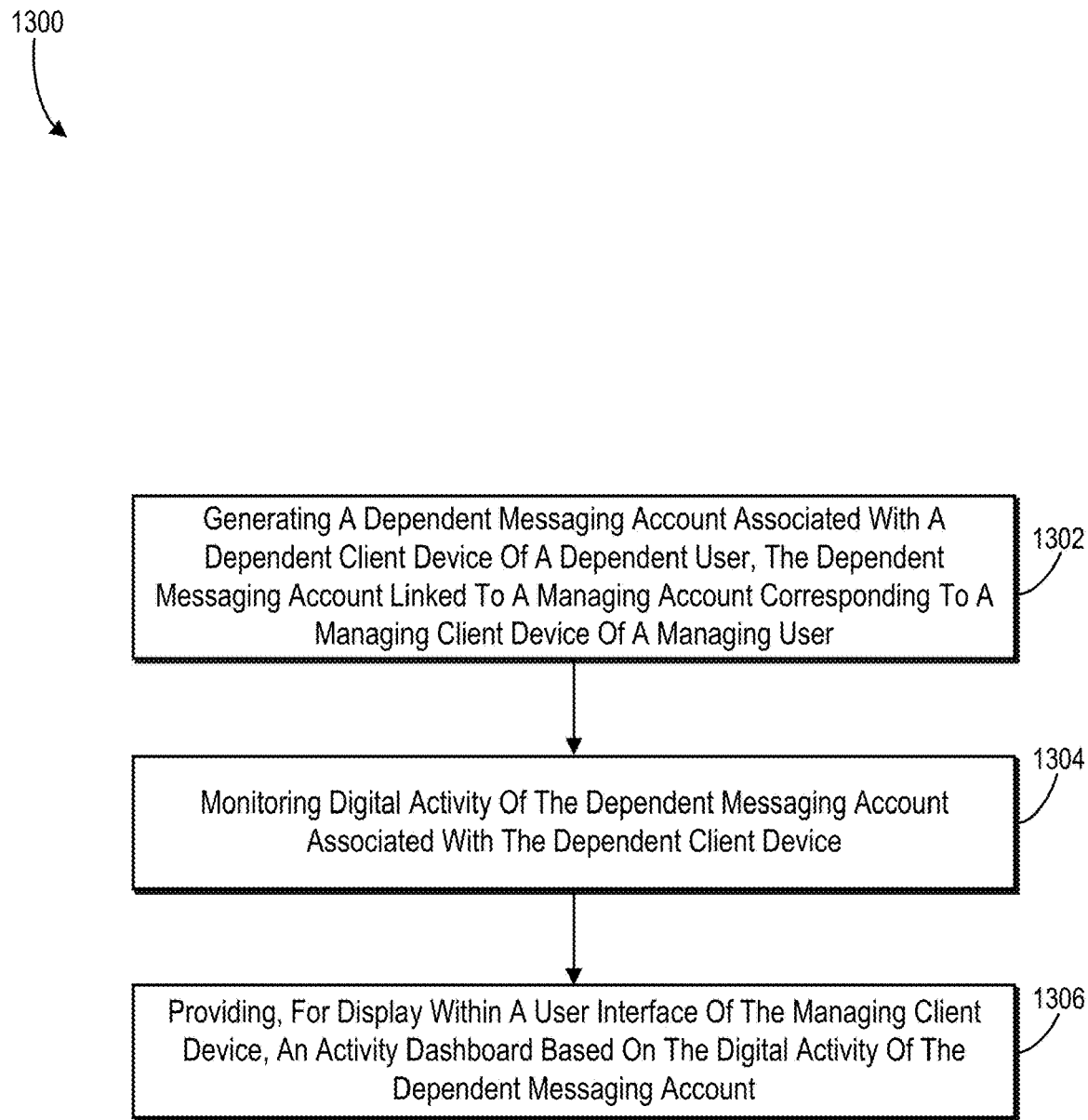
FIG. 13 illustrates a flowchart of a series of acts for providing, for display within a user interface, an activity dashboard in accordance with one or more embodiments.

FIGS. 1-12, the corresponding text, and the examples provide several different systems, methods, techniques, components, and/or devices of the activity dashboard system 104 in accordance with one or more embodiments. In addition to the above description, one or more embodiments can also be described in terms of flowcharts including acts for accomplishing a particular result. For example, FIG. 13 illustrates a flowchart of a series of acts 1300 for providing, for display within a user interface, an activity dashboard in accordance with one or more embodiments. The activity dashboard system 104 may perform one or more acts of the series of acts 1300 in addition to or alternatively to one or more acts described in conjunction with other figures. While FIG. 13 illustrates acts according to one embodiment, alternative embodiments may omit, add to, reorder, and/or modify any of the acts shown in FIG. 13. The acts of FIG. 13 can be performed as part of a method. Alternatively, a non-transitory computer-readable medium can comprise instructions that, when executed by one or more processors, cause a computing device to perform the acts of FIG. 13. In some embodiments, a system can perform the acts of FIG. 13.

As shown, the series of acts 1300 includes an act 1302 of generating a dependent messaging account associated with a dependent client device, the dependent messaging account linked to a managing account corresponding to a managing client device. The series of acts 1300 further includes an act 1304 of monitoring digital activity of the dependent messaging account associated with the dependent client device.

The series of acts 1300 further includes an act 1306 of providing, for display within a user interface of the managing client device, an activity dashboard based on the digital activity of the dependent messaging account. In some embodiments, the activity dashboard comprises: a digital communications field for displaying indicators of digital communications between the dependent client device and third-party client devices (or in some cases, between the dependent messaging account and additional dependent messaging accounts); a digital complaint field for displaying indicators of digital complaints from the dependent client device regarding digital activity of one or more third-party client devices (or in some cases, for displaying indicators of digital complaints from the dependent messaging account regarding digital activity of one or more additional messaging accounts); and a digital media item field for displaying digital media items exchanged between the dependent client device and at least one third-party client device (or in some cases, between the dependent messaging account and an additional messaging account).

It is understood that the outlined acts in the series of acts 1300 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 13, act(s) in the series of acts 1300 may include an act of: identifying a plurality of digital communications between the dependent client device and a plurality of third-party client devices (or in some cases, between the dependent messaging account and a plurality of additional messaging accounts); and providing, for display within the digital communications field of the activity dashboard of the managing client device, a plurality of indicators of the plurality of digital communications, the plurality of indicators comprising a count element reflecting a number of digital communications between the dependent client device and a first third-party client device of the plurality of third-party client devices (or in some cases, between the dependent messaging account and a first additional messaging account of the plurality of additional messaging accounts).

As another example of an additional act not shown in FIG. 13, act(s) in the series of acts 1300 may include an act of: identifying one or more digital complaints from the dependent client device regarding at least one of a digital communication from a third-party client device, a digital media item from the third-party client device, or an account corresponding to the third-party client device; and providing, for display within the digital complaint field of the activity dashboard of the managing client device, at least one indicator of at least one of: the digital communication from the third-party client device, the digital media item from the third-party client device, or the account corresponding to the third-party client device.

Additionally or alternatively, act(s) in the series of acts 1300 may include an act of: identifying one or more digital complaints from the dependent messaging account regarding at least one of a digital communication from an additional messaging account, a digital media item from the additional messaging account, or the additional messaging account; and providing, for display within the digital complaint field of the activity dashboard of the managing client device, at least one indicator of at least one of: the digital communication from the additional messaging account, the digital media item from the additional messaging account, or the additional messaging account.

As yet another example of an additional act not shown in FIG. 13, act(s) in the series of acts 1300 may include an act of: identifying user interaction with the at least one indicator of the digital complaint field on the managing client device; and in response to the user interaction, providing, for display within the user interface of the managing client device at least one of: a content removal option to remove at least one of the digital communication or the digital media item from the dependent messaging account; or a contact removal option to remove the account corresponding to the third-party client device as a contact of the dependent messaging account (or in some cases, a contact removal option to remove the additional messaging account as a contact of the dependent messaging account).

As a further example of an additional act not shown in FIG. 13, act(s) in the series of acts 1300 may include an act of: identifying a digital media item exchanged between the dependent client device and a third-party client device; and providing, for display within the digital media item field of the activity dashboard, the digital media item and at least two of the following: a sender device, a recipient device, a messaging thread name, or a timestamp corresponding to the digital media item. Similarly, act(s) in the series of acts 1300 may include an act of: identifying a digital media item exchanged between the dependent messaging account and the additional messaging account; and providing, for display within the digital media item field of the activity dashboard, the digital media item and at least two of the following: a sender account, a recipient account, a messaging thread name, or a timestamp corresponding to the digital media item.

For another example of an additional act not shown in FIG. 13, act(s) in the series of acts 1300 may include an act of: identifying user interaction with the digital media item in the digital media item field; and in response to identifying the user interaction, providing, for display within the user interface of the managing client device, at least one of: a content removal option to remove the digital media item from the dependent messaging account; or a content reporting option to report the digital media item.

In another example of an additional act not shown in FIG. 13, act(s) in the series of acts 1300 may include an act of removing the digital media item from a messaging thread on the dependent client device in response to user interaction with the content removal option at the managing client device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 14:
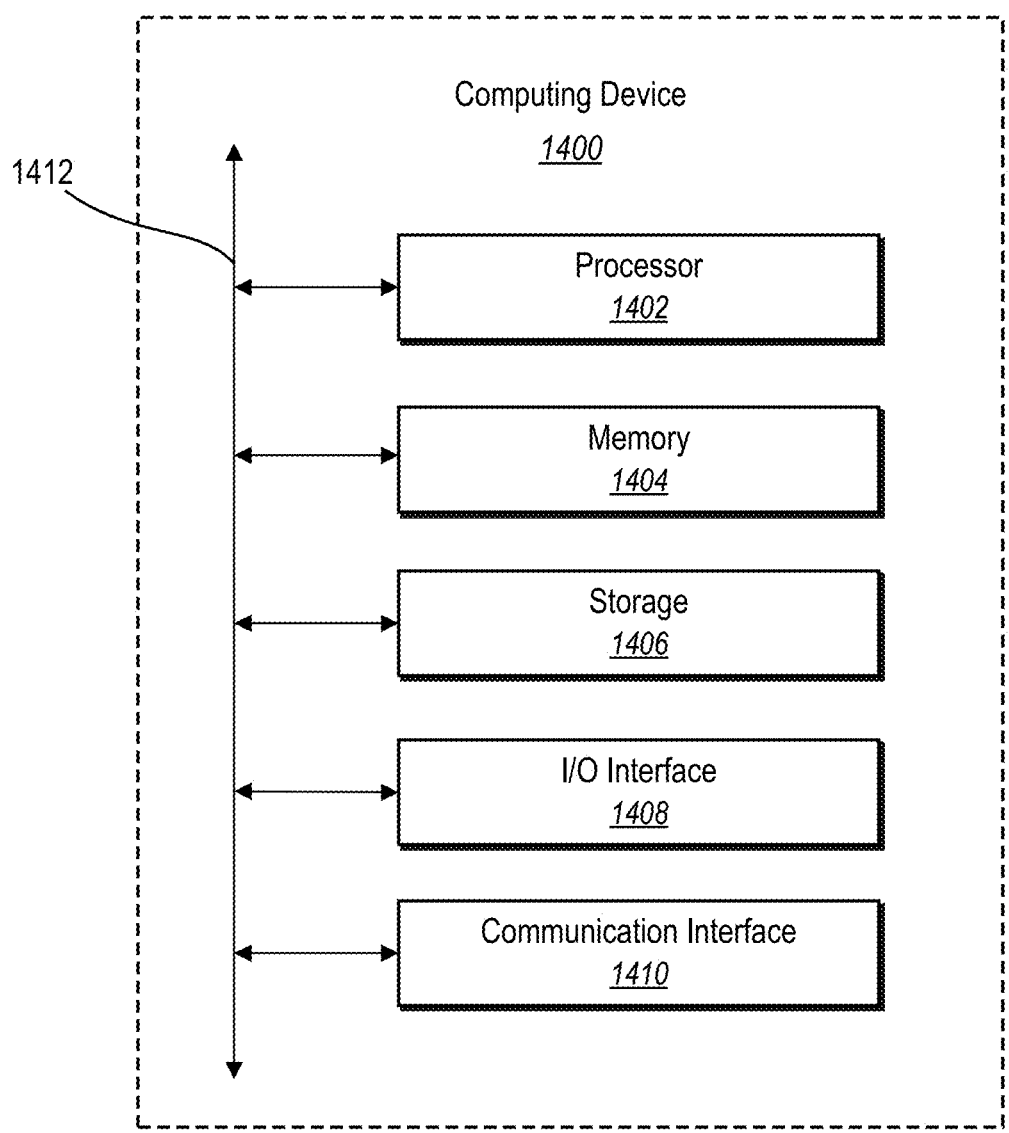
FIG. 14 illustrates a block diagram of an example computing device for implementing one or more embodiments of the present disclosure.

FIG. 14 illustrates a block diagram of an example computing device 1400 that may be configured to perform one or more of the processes described above. One will appreciate that one or more computing devices, such as the computing device 1400 may represent the computing devices described above (e.g., the server(s) 102, the managing client devices 106, the dependent client devices 110, the managing computing devices 400-600, 800, the dependent computing device 700, the trusted contact client devices 116, 902, and/or the computing devices 1000-1100). In one or more embodiments, the computing device 1400 may be a mobile device (e.g., a mobile telephone, a smartphone, a PDA, a tablet, a laptop, a camera, a tracker, a watch, a wearable device, etc.). In some embodiments, the computing device 1400 may be a non-mobile device (e.g., a desktop computer or another type of client device). Further, the computing device 1400 may be a server device that includes cloud-based processing and storage capabilities.

As shown in FIG. 14, the computing device 1400 can include one or more processor(s) 1402, memory 1404, a storage device 1406, input/output interfaces 1408 (or "I/O interfaces 1408"), and a communication interface 1410, which may be communicatively coupled by way of a communication infrastructure (e.g., bus 1412). While the computing device 1400 is shown in FIG. 14, the components illustrated in FIG. 14 are not intended to be limiting. Additional or alternative components may be used in other embodiments. Furthermore, in certain embodiments, the computing device 1400 includes fewer components than those shown in FIG. 14. Components of the computing device 1400 shown in FIG. 14 will now be described in additional detail.

In particular embodiments, the processor(s) 1402 includes hardware for executing instructions, such as those making up a computer program. As an example, and not by way of limitation, to execute instructions, the processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, the storage device 1406 can include a non-transitory storage medium described above. The storage device 1406 may include a hard disk drive (HDD), flash memory, a Universal Serial Bus (USB) drive or a combination these or other storage devices.

As shown, the computing device 1400 includes one or more I/O interfaces 1408, which are provided to allow a user to provide input to (such as user strokes), receive output from, and otherwise transfer data to and from the computing device 1400. These I/O interfaces 1408 may include a mouse, keypad or a keyboard, a touch screen, camera, optical scanner, network interface, modem, other known I/O devices or a combination of such I/O interfaces 1408. The touch screen may be activated with a stylus or a finger.

The I/O interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1408 are configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 provides one or more interfaces for communication (such as, for example, packet-based communication) between the computing device and one or more other computing devices or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can include hardware, software, or both that connects components of the computing device 1400 to each other.

As mentioned above, the activity dashboard system can be included in a social networking system. A social networking system may enable its users (such as persons or organizations) to interact with the system and with each other. The social networking system may, with input from a user, create and store in the social networking system a user profile associated with the user. As described above, the user profile may include demographic information, communication channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending on the user's configured privacy settings. Herein, the term "friend" may refer to any other user of the social networking system with which a user has formed a connection, association, or relationship via the social networking system.

Figure 15:
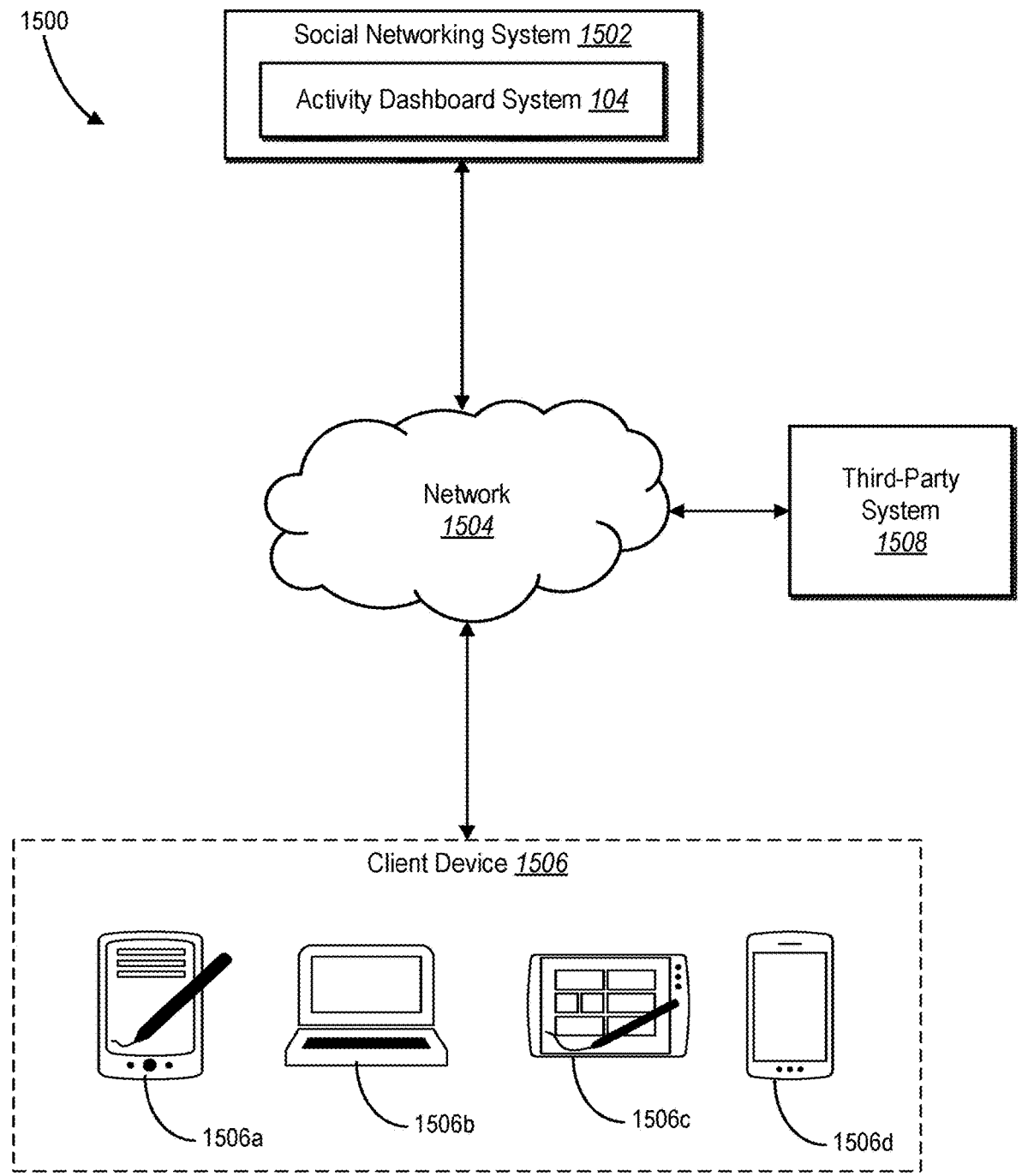
FIG. 15 illustrates a network environment of a social networking system according to one or more embodiments.

FIG. 15 illustrates an example network environment 1500 of a social networking system implementing the activity dashboard system 104 in accordance with one or more embodiments. The network environment 1500 includes a client device 1506 (e.g., one or more of the illustrated client devices 1506*a*, 1506*b*, 1506*c*, 1506*d*), a social networking system 1502, and a third-party system 1508 connected to each other by a network 1504. Although FIG. 15 illustrates a particular arrangement of client device 1506, the social networking system 1502, the third-party system 1508, and the network 1504, this disclosure contemplates any suitable arrangement and number of client device 1506, the social networking system 1502, the third-party system 1508, and the network 1504.

Links may connect the client device 1506, the social networking system 1502, and the third-party system 1508 to the network 1504 or to each other. Links need not necessarily be the same throughout network environment 1500. One or more first links may differ in one or more respects from one or more second links.

In some embodiments, the client device 1506 may be an electronic device including hardware, software, or embedded logic components or a combination of two or more such components and capable of carrying out the appropriate functionalities implemented or supported by the client device 1506. As an example, a client device 1506 may include any of the computing devices discussed above in relation to FIG. 15. The client device 1506 may enable a network user at the client device 1506 to access the network 1504. The client device 1506 may enable its user to communicate with other users at other client devices or systems.

In some embodiments, the client device 1506 may include a web browser, such as and may have one or more add-ons, plug-ins, or other extensions. The client device 1506 may render a web page based on the HTML files from the server for presentation to the user.

In some embodiments, the social networking system 1502 may be a network-addressable computing system that can host an online social network. In addition, the social networking system 1502 may generate, store, receive, and send social-networking data, such as, for example, user-profile data, concept-profile data, the social-graph information, or other suitable data related to the online social network. The social networking system 1502 may be accessed by the other components of the network environment 1500 either directly or via the network 1504.

As shown, the social networking system 1502 includes the activity dashboard system 104, which is described above. The activity dashboard system 104 may be implemented on a unitary server or a distributed server spanning multiple computers or multiple datacenters. These servers may be of various types, such as, for example and without limitation, web server, news server, mail server, message server, advertising server, file server, application server, exchange server, database server, proxy server, etc., or any combination thereof.

In some embodiments, the social networking system 1502 may include one or more data stores. Data stores may be used to store various types of information. In some embodiments, the information stored in data stores may be organized according to specific data structures. Particular embodiments may provide interfaces that enable the client device 1506, the social networking system 1502, or the third-party system 1508 to manage, retrieve, modify, add, or delete, the information stored in data stores.

In some embodiments, the social networking system 1502 may store one or more social graph, described below. In one or more embodiments, the social networking system 1502 may provide users with the ability to take actions on various types of items or objects, supported by social networking system 1502. As an example, the items and objects may include groups or social networks to which users of the social networking system 1502 may belong, events or calendar entries in which a user might be interested, computer-based applications that a user may use, transactions that allow users to buy or sell items via the customer service, interactions with advertisements that a user may perform, etc. A user may also interact with anything that is capable of being represented in the social networking system 1502 or by an external system of the third-party system 1508, which is separate from the social networking system 1502 and coupled to the social networking system 1502 via the network 1504.

The social networking system 1502 can include a variety of stores, modules, and/or managers as described below. In one or more embodiments, a connection manager may be used for storing connection information about users. The connection information may indicate users who have similar or common work experience, group memberships, hobbies, educational history, or are in any way related or share common attributes. The connection information may also include user-defined connections between different users and content (both internal and external). An action-logging manager may be used to receive communications from a web server about a user's actions on or off the social networking system 1502. In conjunction with the action log, a third-party content object log may be maintained of user exposures to third-party content objects. An advertisement-pricing module may combine social information, the current time, location information, or other suitable information to provide relevant advertisements, in the form of notifications, to a user.

Authorization servers may be used to enforce one or more privacy settings of the users of the social networking system 1502. A privacy setting of a user determines how particular information associated with a user can be shared. The authorization server may allow users to opt in to or opt out of having their actions logged by the social networking system 1502 or shared with other systems (e.g., the third-party system 1508), such as, for example, by setting appropriate privacy settings.

In some embodiments, the third-party system 1508 may include one or more types of servers, one or more data stores, one or more interfaces, including but not limited to APIs, one or more web services, one or more content sources, one or more networks, or any other suitable components. The third-party system 1508 may be operated by a different entity from an entity operating the social networking system 1502 even if, in some embodiments, the social networking system 1502 and the third-party systems 1508 operate in conjunction with each other. In this sense, the social networking system 1502 may provide a platform, or backbone, which other systems, such as the third-party systems 1508, may use to provide social-networking services and functionality to users across the Internet.

In some embodiments, a third-party system 1508 may include a third-party content object provider. A third-party content object provider may include one or more sources of content objects, which may be communicated to the client device 1506. As an example, content objects may include information regarding things or activities of interest to the user. As another example, content objects may include incentive content objects.

Figure 16:
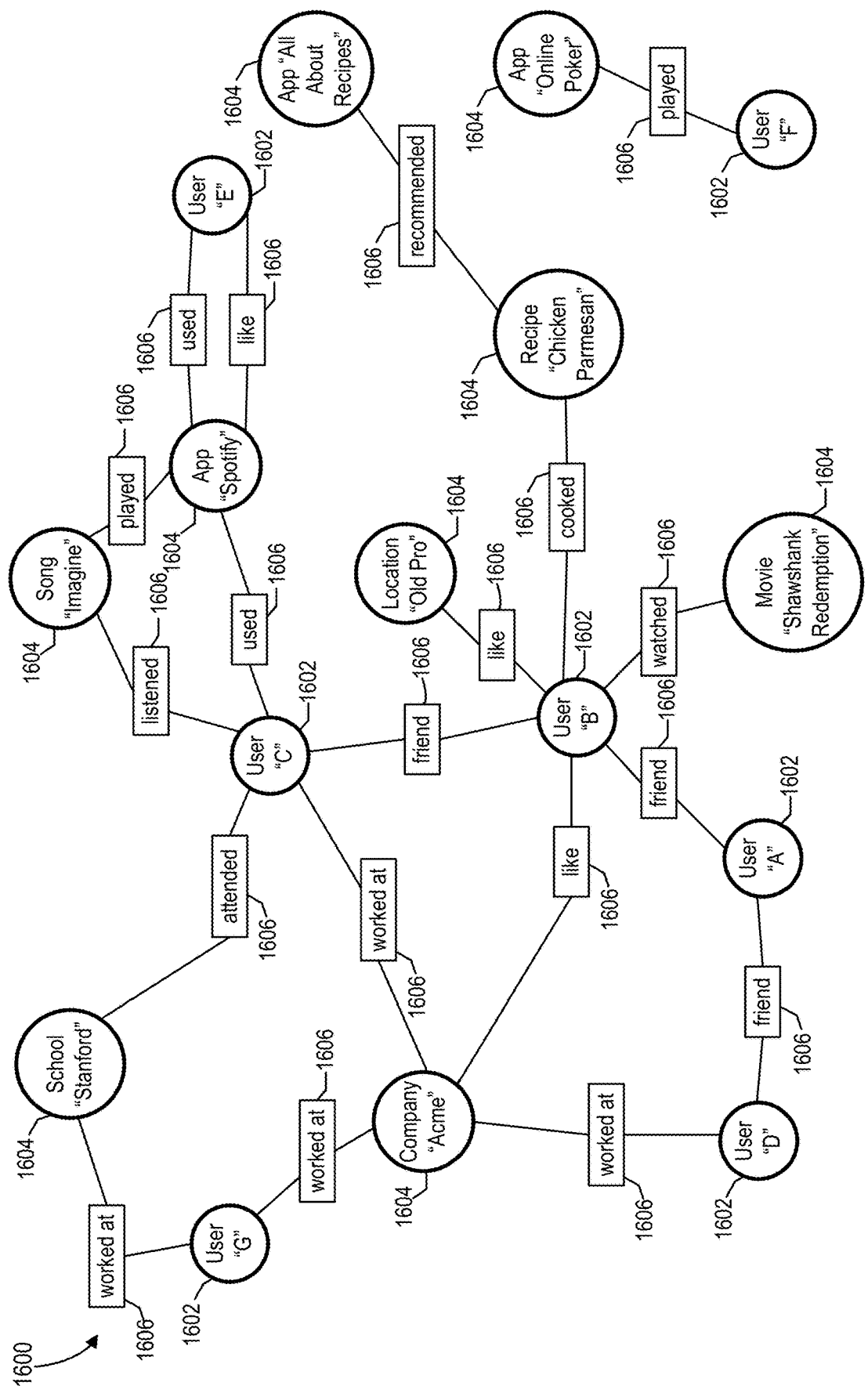
FIG. 16 illustrates an example social graph for a social networking system in accordance with one or more embodiments.

FIG. 16 illustrates an example social graph 1600 for the social networking system 1502 in accordance with one or more embodiments. In some embodiments, the social networking system 1502 may store one or more social graphs 1600 in one or more data stores. In some embodiments, the social graph 1600 may include multiple nodes—which may include multiple user nodes or multiple concept nodes—and multiple edges 1606 connecting the nodes. The social graph 1600 illustrated in FIG. 16 is shown, for didactic purposes, in a two-dimensional visual map representation.

In some embodiments, a user node 1602 may correspond to a user of social networking system 1502. When a user registers for an account with social networking system 1502, the social networking system 1502 may create a user node 1602 corresponding to the user and store the user node 1602 in one or more data stores. Users and user nodes described herein may, where appropriate, refer to registered users and user nodes associated with registered users.

In some embodiments, a concept node 1604 may correspond to a concept. As an example, a concept may correspond to a place, a website, an entity, a resource, etc. A concept may be located within social networking system 1502 or on an external server. A concept node 1604 may be associated with information of a concept provided by a user or information gathered by various systems, including the social networking system 1502.

In some embodiments, a node in social graph 1600 may represent or be represented by an online profile page. Profile pages may be hosted by or accessible to social networking system 1502. Profile pages may be viewable by all or a selected subset of other users. As an example, a user node 1602 may have a corresponding user-profile page where the corresponding user may add content, make declarations, or otherwise express him or herself. As another example, a concept node 1604 may have a corresponding concept-profile page in which one or more users may add content, make declarations, or express themselves, particularly in relation to the concept corresponding to concept node 1604.

As an example, an edge 1606 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships.

In some embodiments, a pair of nodes in social graph 1600 may be connected to each other by one or more edges 1606. An edge 1606 connecting a pair of nodes may represent a relationship between the pair of nodes. In some embodiments, an edge 1606 may include or represent one or more data objects or attributes corresponding to the relationship between a pair of nodes. As an example, a first user may indicate that a second user is a "friend" of the first user. In response to this indication, the social networking system 1502 may send a "friend request" to the second user. If the second user confirms the "friend request," the social networking system 1502 may create an edge 1606 connecting the first user's user node 1602 to the second user's user node 1602 in social graph 1600 and store edge 1606 as social-graph information in one or more of data stores.

In some embodiments, an edge 1606 between a user node 1602 and a concept node 1604 may represent a particular action or activity performed by a user associated the with the user node 1602 toward a concept associated with the concept node 1604. As an example, as illustrated in FIG. 16, a user may "like," "attended," "played," "listened," "cooked," "worked at," or "watched" a concept, each of which may correspond to an edge type or subtype.

In some embodiments, the social networking system 1502, the client device 1506, or the third-party system 1508 may access the social graph 1600 and related social-graph information for suitable applications. The nodes and edges of social graph 1600 may be stored as data objects, for example, in a data store (such as a social-graph database). Such a data store may include one or more searchable or queryable indexes of nodes or edges of social graph 1600.

In some embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition, or as an alternative, an advertisement may be one or more sponsored stories (e.g., a news feed or ticker item on the social networking system 1502).

An advertisement may also include social networking system functionality with which a user may interact. As an example, an advertisement may enable a user to "like" or otherwise endorse the advertisement by selecting an icon or link associated with an endorsement. In addition, or as an alternative, an advertisement may include social networking system context directed to the user. As an example, an advertisement may display information about a friend of the user within social networking system 1502 who has taken an action associated with the subject matter of the advertisement.

In some embodiments, the social networking system 1502 may determine the social-graph affinity (herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1508 or other suitable systems. An overall affinity for a social-graph entity for each user, subject matter, or type of content may be established. The overall affinity may change based on continued monitoring of the actions or relationships associated with the social-graph entity.

In some embodiments, the social networking system 1502 may measure or quantify social-graph affinity using an affinity coefficient (herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions.

Coefficients may be used to predict any number of actions, which may be within or outside of the online social network. As an example, these actions may include various types of communications, such as sending messages, posting content, or commenting on content; various types of observation actions, such as accessing or viewing profile pages, media, or other suitable content; various types of coincidence information about two or more social-graph entities, such as purchasing a product from a merchant.

In some embodiments, the social networking system 1502 may use a variety of factors to calculate a coefficient. These factors may include, for example, user actions, types of relationships between objects, location information, other suitable factors, or any combination thereof. In some embodiments, different factors may be weighted differently when calculating the coefficient. The weights for each factor may be static, or the weights may change according to, for example, the user, the type of relationship, the type of action, the user's location, and so forth. Ratings for the factors may be combined according to their weights to determine an overall coefficient for the user.

To calculate the coefficient of a user towards a particular object, the rating assigned to the user's actions may comprise, for example, 60% of the overall coefficient, while the relationship between the user and the object may comprise 40% of the overall coefficient. In some embodiments, the social networking system 1502 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof.

A coefficient may include a decay factor that causes the strength of the signal provided by particular actions to decay with time, such that actions that are more recent are more relevant when calculating the coefficient. The ratings and weights may be continuously updated based on continued tracking of the actions upon which the coefficient is based. Any process or algorithm may be employed for assigning, combining, averaging, and so forth the ratings for each factor and the weights assigned to the factors. In some embodiments, the social networking system 1502 may determine coefficients using machine-learning algorithms trained on historical actions and past user responses, or data farmed from users by exposing them to various options and measuring responses.

In some embodiments, the social networking system 1502 may calculate a coefficient based on a user's actions. The social networking system 1502 may monitor such actions on the online social network, on the third-party system 1508, on other suitable systems, or any combination thereof. Typical user actions include viewing profile pages, creating or posting content, interacting with content, joining groups, listing and confirming attendance at events, checking-in at locations, liking particular pages, creating pages, and performing other tasks that facilitate social action.

In some embodiments, the social networking system 1502 may calculate a coefficient based on the user's actions with particular types of content. The content may be associated with the online social network, the third-party system 1508, or another suitable system. The social networking system 1502 may analyze a user's actions to determine whether one or more of the actions indicate an affinity for subject matter, content, other users, and so forth.

In some embodiments, the social networking system 1502 may calculate a coefficient based on the type of relationship between particular objects. Referencing the social graph 1600, the social networking system 1502 may analyze the number and/or type of edges 1606 connecting particular user nodes and concept nodes 1604 when calculating a coefficient. As an example, depending upon the weights assigned to the actions and relationships for the particular user, the overall affinity may be determined to be higher for content about a user's spouse than for content about a user's friend.

In some embodiments, the coefficient may be based on the degree of separation between particular objects. The degree of separation between any two nodes is defined as the minimum number of hops needed to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are not connected directly, but are connected through another user node (i.e., are second-degree nodes) may be described as "friends of friends." The lower coefficient may represent the decreasing likelihood that the first user will share an interest in content objects of the user that is indirectly connected to the first user in the social graph 1600.

In some embodiments, the social networking system 1502 may calculate a coefficient based on location information. Objects that are geographically closer to each other may be considered to be more related, or of more interest, to each other than more distant objects. In some embodiments, the coefficient of a user towards a particular object may be based on the proximity of the object's location to a current location associated with the user (or the location of a client device 1506 of the user). A first user may be more interested in other users or concepts that are closer to the first user. As an example, if a user is one mile from an airport and two miles from a gas station, the social networking system 1502 may determine that the user has a higher coefficient for the airport than the gas station based on the proximity of the airport to the user.

In some embodiments, the social networking system 1502 may perform particular actions with respect to a user based on the coefficient information. The coefficients may be used to predict whether a user will perform a particular action based on the user's interest in the action. A coefficient may be used when generating or presenting any type of objects to a user. The coefficient may also be utilized to rank and order such objects, as appropriate. In this way, the social networking system 1502 may provide information that is relevant to user's interests and current circumstances, increasing the likelihood that they will find such information of interest.

In some embodiments, the social networking system 1502 may generate search results based on the coefficient information. Search results for a particular user may be scored or ranked based on the coefficient associated with the search results with respect to the querying user. As an example, search results corresponding to objects with higher coefficients may be ranked higher on a search-results page than results corresponding to objects having lower coefficients.

In connection with social-graph affinity and affinity coefficients, particular embodiments may utilize one or more systems, components, elements, functions, methods, operations, or steps disclosed in U.S. patent application Ser. No. 11/503,093, filed Aug. 10, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, filed Oct. 1, 2012, each of which is incorporated by reference in their entirety.

In some embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. In some embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network.

In some embodiments, one or more servers may be authorization/privacy servers for enforcing privacy settings. In response to a request from a user (or other entity) for a particular object stored in a data store, the social networking system 1502 may send a request to the data store for the object. The request may identify the user associated with the request and may be sent to the user (or the client device 1506 of the user) if the authorization server determines that the user is authorized to access the object based on the privacy settings associated with the object, but not otherwise.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
   generate a dependent messaging account associated with a dependent client device, the dependent messaging account linked to a managing account corresponding to a managing client device;
   monitor digital activity of the dependent messaging account, the digital activity comprising digital communications between the dependent messaging account and an additional messaging account, wherein the digital communications comprise at least one of digital text-based messages, digital videos, or digital images; and
   provide, for display within a user interface of the managing client device, an activity dashboard for regulating digital content for the dependent messaging account based on the digital activity of the dependent messaging account, the activity dashboard comprising a digital communications field for displaying one or more indicators of the digital communications between the dependent messaging account and the additional messaging account.

2. The non-transitory computer-readable medium of claim 1, further comprising instructions that, when executed by the at least one processor, cause the computing device to generate the dependent messaging account by identifying a user account within a digital communication system that has digital content privileges set by the managing account.

3. The non-transitory computer-readable medium of claim 1, further comprising instructions that, when executed by the at least one processor, cause the computing device to monitor the digital activity of the dependent messaging account by detecting digital game information received by the dependent messaging account or sent from the dependent messaging account.

4. The non-transitory computer-readable medium of claim 1, further comprising instructions that, when executed by the at least one processor, cause the computing device to provide the activity dashboard for display within the user interface of the managing client device;
   a first count of a number of digital text-based messages exchanged between the dependent messaging account and additional messaging accounts; and
   a second count of a number of digital videos exchanged between the dependent messaging account and the additional messaging account.

5. The non-transitory computer-readable medium of claim 1, further comprising instructions that, when executed by the at least one processor, cause the computing device to:
   determine a count of a number of the digital communications between the dependent messaging account and the additional messaging account; and
   generate, for display within the activity dashboard on the managing client device, a digital activity indicator notifying the managing account of the count of the number of the digital communications between the dependent messaging account and the additional messaging account.

6. The non-transitory computer-readable medium of claim 1, further comprising instructions that, when executed by the at least one processor, cause the computing device to modify digital content received by the dependent messaging account based on an indication from the managing account.

7. The non-transitory computer-readable medium of claim 1, further comprising instructions that, when executed by the at least one processor, cause the computing device to modify contact control privileges for a digital contact associated with the dependent messaging account based on an indication from the managing account.

8. A system comprising:
   at least one processor; and
   at least one non-transitory computer-readable storage medium storing instructions that, when executed by the at least one processor, cause the system to:
      generate a dependent messaging account associated with a dependent client device, the dependent messaging account linked to a managing account corresponding to a managing client device;
      monitor digital activity of the dependent messaging account, the digital activity comprising digital communications between the dependent messaging account and an additional messaging account, wherein the digital communications comprise at least one of digital text-based messages, digital videos, or digital images; and
      provide, for display within a user interface of the managing client device, an activity dashboard for regulating digital content for the dependent messaging account based on the digital activity of the dependent messaging account, the activity dashboard comprising a digital communications field for displaying one or more indicators of the digital communications between the dependent messaging account and additional messaging account.

9. The system of claim 8, further comprising instructions that, when executed by the at least one processor, cause the system to generate the dependent messaging account by identifying a user account within a digital communication system that has digital content privileges set by the managing account.

10. The system of claim 8, further comprising instructions that, when executed by the at least one processor, cause the system to monitor the digital activity of the dependent messaging account by detecting digital game information received by the dependent messaging account or sent from the dependent messaging account.

11. The system of claim 8, further comprising instructions that, when executed by the at least one processor, cause the system to provide the activity dashboard for display within the user interface of the managing client device by providing a first set of selectable options for modifying digital content associated with the dependent messaging account and a second set of selectable options for modifying digital contacts associated with the dependent messaging account.

12. The system of claim 8, further comprising instructions that, when executed by the at least one processor, cause the system to:
   determine a count of a number of the digital communications between the dependent messaging account and the additional messaging account; and
   generate, for display within the activity dashboard on the managing client device, a digital activity indicator notifying the managing account of the count of the number of the digital communications between the dependent messaging account and the additional messaging account.

13. The system of claim 8, further comprising instructions that, when executed by the at least one processor, cause the system to modify digital content received by the dependent messaging account based on an indication from the managing account.

14. The system of claim 8, further comprising instructions that, when executed by the at least one processor, cause the system to modify contact control privileges for a digital contact associated with the dependent messaging account based on an indication from the managing account.

15. A computer-implemented method comprising:
generating a dependent messaging account associated with a dependent client device, the dependent messaging account linked to a managing account corresponding to a managing client device;
monitoring digital activity of the dependent messaging account, the digital activity comprising digital communications between the dependent messaging account and an additional messaging account, wherein the digital communications comprise at least one of digital text-based messages, digital videos, or digital images; and
providing, for display within a user interface of the managing client device, an activity dashboard for regulating digital content for the dependent messaging account based on the digital activity of the dependent messaging account, the activity dashboard comprising a digital communications field for displaying one or more indicators of the digital communications between the dependent messaging account and the additional messaging account.

16. The computer-implemented method of claim 15, further comprising generating the dependent messaging account by identifying a user account within a digital communication system that has digital content privileges set by the managing account.

17. The computer-implemented method of claim 15, further comprising monitoring the digital activity of the dependent messaging account by detecting digital game information received by the dependent messaging account or sent from the dependent messaging account.

18. The computer-implemented method of claim 15, further comprising providing the activity dashboard for display within the user interface of the managing client device by providing a first set of selectable options for modifying digital content associated with the dependent messaging account and a second set of selectable options for modifying digital contacts associated with the dependent messaging account.

19. The computer-implemented method of claim 15, further comprising:
determining a count of a number of the digital communications between the dependent messaging account and the additional messaging account; and
generating, for display within the activity dashboard on the managing client device, a digital activity indicator notifying the managing account of the count of the number of the digital communications between the dependent messaging account and the additional messaging account.

20. The computer-implemented method of claim 15, further comprising modifying digital content received by the dependent messaging account based on an indication from the managing account.

* * * * *